(12) United States Patent
Lee et al.

(10) Patent No.: US 12,463,271 B2
(45) Date of Patent: Nov. 4, 2025

(54) BATTERY PACK

(71) Applicant: Samsung SDI Co., Ltd., Yongin-si (KR)

(72) Inventors: Jooyul Lee, Yongin-si (KR); Nohyun Kwag, Yongin-si (KR); Seungil Kim, Yongin-si (KR); Gangya Park, Yongin-si (KR); Jungjin Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/179,268

(22) Filed: Mar. 6, 2023

(65) Prior Publication Data

US 2023/0207925 A1    Jun. 29, 2023

Related U.S. Application Data

(62) Division of application No. 16/595,900, filed on Oct. 8, 2019, now Pat. No. 11,742,537.

(30) Foreign Application Priority Data

Oct. 17, 2018    (KR) .......................... 10-2018-0123928

(51) Int. Cl.
*H01M 10/6567* (2014.01)
*H01M 10/42* (2006.01)
(Continued)

(52) U.S. Cl.
CPC ... *H01M 10/6567* (2015.04); *H01M 10/4257* (2013.01); *H01M 10/613* (2015.04);
(Continued)

(58) Field of Classification Search
CPC .... H01M 10/60; H01M 10/61; H01M 10/613; H01M 10/615; H01M 10/617;
(Continued)

(56) References Cited

U.S. PATENT DOCUMENTS 5,578,392 A    11/1996    Kawamura
6,379,837 B1    4/2002    Takahashi et al.
(Continued)

FOREIGN PATENT DOCUMENTS

CN    101192653 A    6/2008
CN    1905267 B    12/2010
(Continued)

OTHER PUBLICATIONS

Korean Office Action dated Apr. 27, 2023, issued in Korean Patent Application No. 10-2018-0119750 (4 pages).
(Continued)

*Primary Examiner* — Matthew W Van Oudenaren
(74) *Attorney, Agent, or Firm* — Womble Bond Dickinson (US) LLP

(57) ABSTRACT

A battery pack includes: battery cells, each including first and second end portions that are opposite each other in a length direction; a case having an accommodation space in which the battery cells and a fluid to cool the battery cells are configured to be accommodated, the case including first and second covers respectively covering the first and second end portions; first and second tab plates respectively on the first and second covers and connected to the first and second end portions; a circuit board on the first tab plate; and a first lead and a second lead through which the first and second tab plates are connected to the circuit board, the first and second leads connected to a first side portion of the circuit board. An arrangement of the leads connected to electrodes of the battery cells is improved, and heat is efficiently dissipated from a switch device.

9 Claims, 15 Drawing Sheets

(51) Int. Cl.

| | | |
|---|---|---|
| *H01M 10/613* | (2014.01) | |
| *H01M 10/643* | (2014.01) | |
| *H01M 50/213* | (2021.01) | |
| *H01M 50/271* | (2021.01) | |
| *H01M 50/284* | (2021.01) | |
| *H01M 50/287* | (2021.01) | |
| *H01M 50/298* | (2021.01) | |
| *H01M 50/505* | (2021.01) | |
| *H01M 50/519* | (2021.01) | |
| *H01M 50/533* | (2021.01) | |

(52) U.S. Cl.
CPC ....... *H01M 50/213* (2021.01); *H01M 50/271* (2021.01); *H01M 50/284* (2021.01); *H01M 50/505* (2021.01); *H01M 10/425* (2013.01); *H01M 10/643* (2015.04); *H01M 50/287* (2021.01); *H01M 50/298* (2021.01); *H01M 50/519* (2021.01); *H01M 50/533* (2021.01)

(58) Field of Classification Search
CPC ......... H01M 10/6552; H01M 10/6554; H01M 10/6555; H01M 10/6556; H01M 10/6557; H01M 10/6565; H01M 10/6568; H01M 10/643; H01M 10/6551; H01M 10/6566; H01M 50/213; H01M 50/284; H01M 50/287; H01M 50/298
See application file for complete search history.

(56) References Cited

U.S. PATENT DOCUMENTS

| | | | |
|---|---|---|---|
| 7,924,562 | B2 | 4/2011 | Soma et al. |
| 8,841,018 | B2 | 9/2014 | Nakano et al. |
| 9,105,900 | B2 | 8/2015 | Kano |
| 9,236,585 | B2 | 1/2016 | Nishikawa et al. |
| 9,406,983 | B2 | 8/2016 | Mingers et al. |
| 9,515,361 | B2 | 12/2016 | Harada et al. |
| 9,660,231 | B2 | 5/2017 | Yoon |
| 9,847,182 | B2 | 12/2017 | Kusaba et al. |
| 10,065,523 | B2 | 9/2018 | Wood et al. |
| 10,347,881 | B2 | 7/2019 | Han |
| 10,411,233 | B2 | 9/2019 | Yoon et al. |
| 10,944,138 | B2 | 3/2021 | Hong et al. |
| 11,081,894 | B2 | 8/2021 | Cheon et al. |
| 11,183,730 | B2 | 11/2021 | Nakamura et al. |
| 11,362,390 | B2 | 6/2022 | Kwag |
| 11,749,848 | B2 | 9/2023 | Kwag |
| 2002/0012833 | A1* | 1/2002 | Gow ................... H01M 10/647 429/149 |
| 2007/0026303 | A1 | 2/2007 | Jeon et al. |
| 2008/0131767 | A1 | 6/2008 | Kim |
| 2008/0311468 | A1 | 12/2008 | Hermann et al. |
| 2009/0059528 | A1 | 3/2009 | Damsohn et al. |
| 2009/0202897 | A1 | 8/2009 | Kim et al. |
| 2011/0008667 | A1 | 1/2011 | Kwag et al. |
| 2011/0027631 | A1 | 2/2011 | Koenigsmann |
| 2011/0165446 | A1 | 7/2011 | Hermann |
| 2011/0195284 | A1 | 8/2011 | Yasui et al. |
| 2011/0305930 | A1 | 12/2011 | Han |
| 2012/0251872 | A1 | 10/2012 | Kim |
| 2012/0315507 | A1 | 12/2012 | Kim |
| 2013/0136965 | A1* | 5/2013 | Nakano ............. H01M 10/4257 429/92 |
| 2014/0093755 | A1 | 4/2014 | Houchin-Miller et al. |
| 2015/0056487 | A1 | 2/2015 | Kobayashi et al. |
| 2015/0118530 | A1 | 4/2015 | Lee |
| 2015/0255225 | A1 | 9/2015 | Kusaba et al. |
| 2016/0172727 | A1 | 6/2016 | Chan et al. |
| 2017/0025717 | A1 | 1/2017 | Zeller et al. |
| 2018/0301771 | A1 | 10/2018 | Jennrich |
| 2019/0067655 | A1 | 2/2019 | Nakamura et al. |
| 2019/0379213 | A1 | 12/2019 | Cheon et al. |
| 2020/0044200 | A1 | 2/2020 | Ochs et al. |
| 2020/0112000 | A1 | 4/2020 | Kwag |
| 2020/0112007 | A1 | 4/2020 | Kwag |
| 2020/0127350 | A1 | 4/2020 | Lee et al. |

FOREIGN PATENT DOCUMENTS

| | | | |
|---|---|---|---|
| CN | 102324770 A | | 1/2012 |
| CN | 202550023 U | | 11/2012 |
| CN | 202797123 | * | 3/2013 |
| CN | 103247766 A | | 8/2013 |
| CN | 103563124 A | | 2/2014 |
| CN | 104471784 A | | 3/2015 |
| CN | 105118937 A | | 12/2015 |
| CN | 105489796 A | | 4/2016 |
| CN | 106169544 A | | 11/2016 |
| CN | 107170945 A | | 9/2017 |
| CN | 107394315 A | | 11/2017 |
| CN | 207116551 U | | 3/2018 |
| CN | 207 183378 U | | 4/2018 |
| CN | 210897381 U | | 6/2020 |
| CN | 210956735 U | | 7/2020 |
| CN | 210956830 U | | 7/2020 |
| CN | 211062826 U | | 7/2020 |
| DE | 10-2008-010820 A1 | | 8/2009 |
| DE | 10-2008-059967 A1 | | 6/2010 |
| DE | 10-2009-035487 A1 | | 2/2011 |
| DE | 10-2016-219302 A1 | | 4/2018 |
| EP | 2302726 A1 | | 3/2011 |
| EP | 2357688 A1 | | 8/2011 |
| EP | 2866295 | | 4/2015 |
| EP | 3217452 A1 | | 9/2017 |
| JP | 1999-67178 A | | 3/1999 |
| JP | H1167178 | * | 3/1999 |
| JP | 2001-313090 A | | 11/2001 |
| JP | 4025928 B2 | | 10/2007 |
| JP | 2008-251471 A | | 10/2008 |
| JP | 2010-97836 A | | 4/2010 |
| JP | 4631118 B2 | | 11/2010 |
| JP | 4791076 B2 | | 7/2011 |
| JP | 5057720 B2 | | 8/2012 |
| JP | 5173227 B2 | | 1/2013 |
| JP | 2013-114780 A | | 6/2013 |
| JP | 2014-197452 A | | 10/2014 |
| JP | 2015-133266 A | | 7/2015 |
| JP | WO2017/175487 A1 | | 10/2017 |
| JP | 2017-536658 A | | 12/2017 |
| KR | 10-2010-0057691 A | | 5/2010 |
| KR | 10-2012-0082579 A | | 7/2012 |
| KR | 10-2013-0035200 A | | 4/2013 |
| KR | 10-2013-0127815 A | | 11/2013 |
| KR | 10-2015-0054532 A | | 5/2015 |
| KR | 10-2015-0070241 A | | 6/2015 |
| KR | 10-2017-0018448 A | | 2/2017 |
| KR | 10-2017-0106933 A | | 9/2017 |
| KR | 10-2018-0063113 A | | 6/2018 |
| KR | 10-2018-0092191 A | | 8/2018 |
| WO | WO 2013/018151 A1 | | 2/2013 |
| WO | WO 2013/124889 A1 | | 8/2013 |
| WO | WO 2015/094035 A1 | | 6/2015 |
| WO | WO 2016/185970 A1 | | 11/2016 |
| WO | WO2016185970 | * | 11/2016 |
| WO | WO 2017/069397 | | 4/2017 |
| WO | WO 2017/175487 A1 | | 10/2017 |
| WO | WO 2018/147545 A1 | | 8/2018 |

OTHER PUBLICATIONS

Chinese Office Action with English translation for CN Application No. 201910949820.8 dated Feb. 11, 2023, 7 pages.
Korean Office action dated Nov. 26, 2019 for corresponding Korean Patent Application No. 10-2018-0123928 (56 pages).
EPO Extended Search Report dated Feb. 28, 2020 for corresponding European Patent Application No. 19202070.9 (8 pages).
EPO Extended Search Report dated Feb. 28, 2020 for corresponding European Patent Application No. 19202039.4 (5 pages).
EPO Extended Search Report dated Mar. 20, 2020 for corresponding European Patent Application No. 19202014.7 (15 pages).

(56) References Cited

OTHER PUBLICATIONS

EPO European Office action dated Jan. 30, 2023 issued in European Patent Application No. 19202070.9 (4 pages).
EPO Extended Search Report dated Apr. 17, 2020 corresponding to European Patent Application No. 19202074.1 (5 pages).
Chinese Notice of Allowance dated Jan. 18, 2023 issued in Chinese Patent Application No. 201910949727.7 (4 pages).
Chinese Notice of Allowance dated Jan. 18, 2023 issued in Chinese Patent Application No. 201910950782.8 (4 pages).
Chinese Office action, with English translation, dated Nov. 11, 2022 issued in corresponding Chinese Patent Application No. 201910949820.8 (15 pages).
US Notice of Allowance dated Dec. 21, 2022, issued in U.S. Appl. No. 16/595,906 (8 pages).
Chinese Office action (with English translation) for CN Application No. 201910949797.2 dated Nov. 1, 2022 (7 pages).
Chinese Office action for CN Application No. 201910949727.7 dated Apr. 24, 2022, 6 pages.
English Translation of Chinese Office action for CN Application No. 201910949727.7 dated Apr. 24, 2022, 6 pages.
Chinese Office action, with English translation, dated Apr. 29, 2022, issued in Chinese Patent Application No. 201910949797.2 (25 pages).
Chinese Office action, with English translation, dated May 7, 2022, issued in corresponding Chinese Patent Application No. 201910949820.8 (22 pages).
Chinese Office action, with English translation, dated Aug. 2, 2022, issued in Chinese Patent Application No. 201910950782.8 (14 pages).
US Notice of Allowance dated Aug. 24, 2022, issued in U.S. Appl. No. 16/595,906 (9 pages).
US Office action dated Oct. 25, 2022, issued in U.S. Appl. No. 16/596,503 (19 pages).
U.S. Office action dated May 4, 2021, issued in U.S. Appl. No. 16/595,906 (30 pages).
U.S. Office action dated Jun. 25, 2021, issued in U.S. Appl. No. 16/596,503 (15 pages).
Translation DE 102008059967 (Year: 2021).
Translation DE 102008010820 (Year: 2021).
Translation DE 102009035487 (Year: 2021).
U.S. Office action dated Aug. 20, 2021, issued in U.S. Appl. No. 16/596,583 (13 pages).
Metals 2020, 10, 1315; doi: 10.3390/met10101315 (Year: 2016).
U.S. Final Office action dated Sep. 29, 2021, issued in U.S. Appl. No. 16/595,906, 36 pages.
U.S. Final Office action dated Nov. 12, 2021, issued in U.S. Appl. No. 16/596,503 (15 pages).
EPO Office action dated Dec. 10, 2020, issued in European Patent Application No. 19202070.9 (5 pages).
U.S. Notice of Allowance from U.S. Appl. No. 16/595,906 dated Mar. 17, 2022, 9 pages.
U.S. Notice of Allowance from U.S. Appl. No. 16/596,583 dated Jan. 12, 2022, 7 pages.
U.S. Restriction Requirement from U.S. Appl. No. 16/596,503 dated Apr. 6, 2021, 7 pages.
EPO Extended European Search Report dated Aug. 4, 2020 issued in corresponding European Patent Application No. 19202014.7 (12 pages).
Korean Office action dated Oct. 5, 2020 issued in corresponding Korean Patent Application No. 10-2020-0099831 (11 pages).
US Notice of Allowance dated Feb. 17, 2023, issued in U.S. Appl. No. 16/596,503 (8 pages).
Korean Office Action dated Nov. 6, 2023, issued in Korean Patent Application No. 10-2018-0119748 (50 pages).
Abstract of JP 2008-251471) Morita et al, "Packed Battery", 2008.
US Office Action dated Jun. 21, 2024, issued in U.S. Appl. No. 18/185,269 (16 pages).
European Office Action dated Jun. 25, 2024, issued in European Patent Application No. 19202014.7 (5 pages).
Korean Office Action dated Nov. 6, 2023, issued in Korean Patent Application No. 10-2018-0119749 (7 pages).
US Office Action dated Nov. 22, 2024, issued in U.S. Appl. No. 18/353,823 (20 pages).
US Final Office Action dated Apr. 24, 2025, issued in U.S. Appl. No. 18/353,823 (10 pages).

* cited by examiner

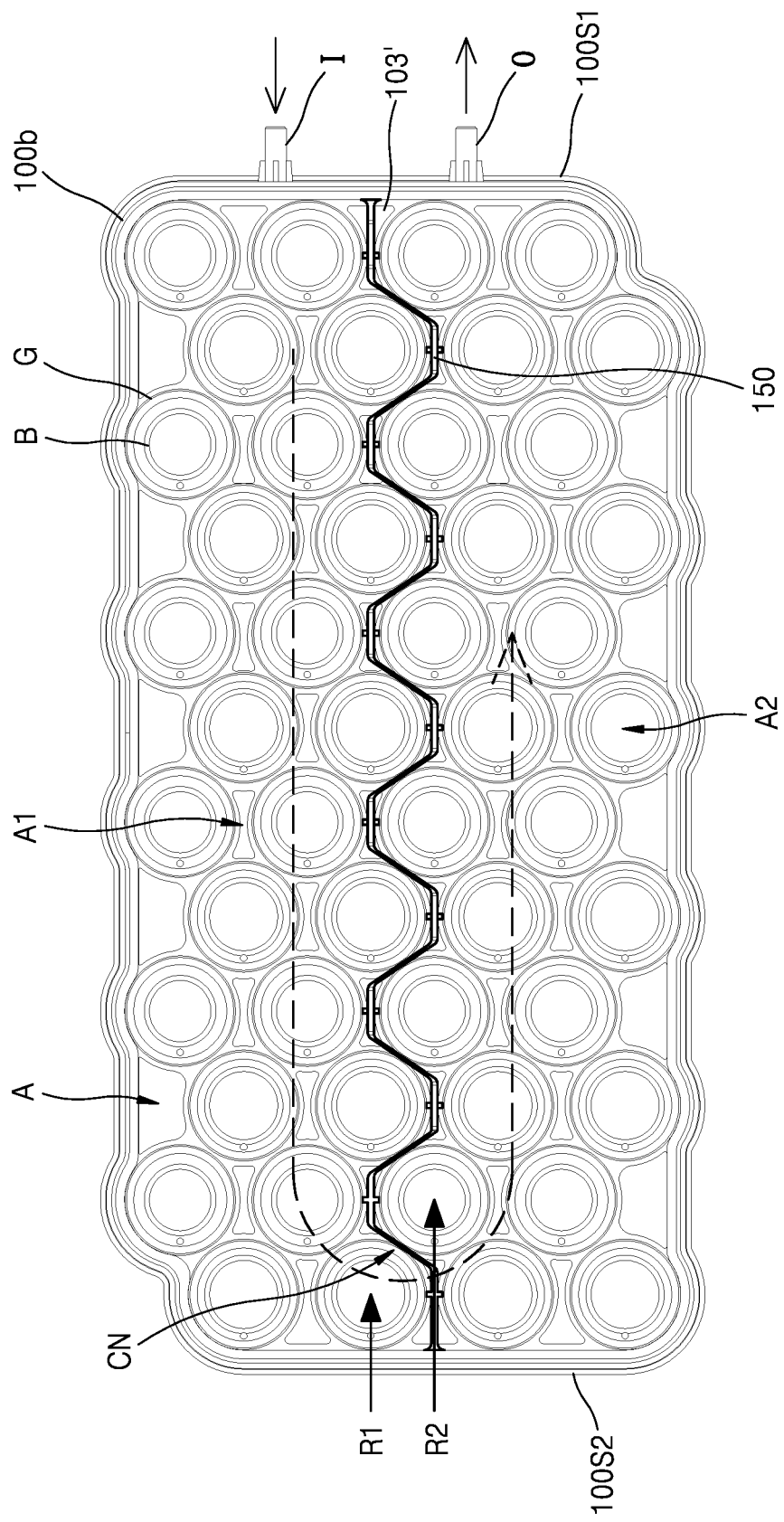

BATTERY PACK

CROSS-REFERENCE TO RELATED APPLICATIONS

This application is a divisional of U.S. patent application Ser. No. 16/595,900, filed on Oct. 8, 2019, which claims priority to and the benefit of Korean Patent Application No. 10-2018-0123928, filed on Oct. 17, 2018 in the Korean Intellectual Property Office, the entire disclosure of which is incorporated herein by reference. This application also incorporates by reference the entirety of each of U.S. application Ser. No. 16/596,503, filed on Oct. 8, 2019 and now pending, U.S. application Ser. No. 16/596,583 filed on Oct. 8, 2019 and issued as U.S. Pat. No. 11,362,390, and U.S. application Ser. No. 16/595,906, filed on Oct. 8, 2019 and now pending.

BACKGROUND

1. Field

Aspects of one or more embodiments relate to a battery pack.

2. Description of the Related Art

In general, secondary batteries are rechargeable, unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected are used according to the types of external devices that use the secondary batteries.

Small mobile devices, such as cellular phones, may be operated for a certain time (e.g., a predetermined time) using single-cell secondary batteries. However, multi-cell secondary batteries (secondary battery packs) having high-output, high-capacity features may be suitable for devices having long operating times and requiring high power, such as electric vehicles or hybrid electric vehicles consuming large amounts of power. The output voltage or current of a battery pack may be increased by adjusting the number of batteries (battery cells) included in the battery pack.

SUMMARY

According to an aspect of one or more embodiments, a battery pack has an improved arrangement structure of leads electrically connected to electrodes of battery cells.

According to another aspect of one or more embodiments, a battery pack is configured to dissipate heat from a switch device more efficiently by using a flow of a cooling fluid accommodated in an accommodation space together with battery cells.

Additional aspects will be set forth, in part, in the description which follows and, in part, will be apparent from the description, or may be learned by practice of the presented embodiments.

According to one or more embodiments, a battery pack includes: battery cells, each including a first end portion and a second end portion that are opposite each other in a length direction of the respective battery cell; a case having an accommodation space in which the battery cells and a cooling fluid to cool the battery cells are configured to be accommodated, the case including first and second covers that respectively cover the first and second end portions of the battery cells; first and second tab plates respectively on the first and second covers and electrically connected to the first and second end portions of the battery cells; a circuit board on the first tab plate; and a first lead and a second lead through which the first and second tab plates are electrically connected to the circuit board, the first and second leads being connected to a first side portion of the circuit board.

The first side portion of the circuit board may include an edge portion extending straight and continuously in a direction.

The first and second leads may not be connected to a second side portion of the circuit board that is opposite the first side portion of the circuit board.

The first and second leads may include a plurality of first leads and a plurality of second leads that extend from a plurality of first tab plates and a plurality of second tab plates, respectively.

The first and second leads may be arranged in a row along the first side portion of the circuit board and connected to the first side portion of the circuit board.

The first leads may be between the second leads neighboring each other and the second leads may be between the first leads neighboring each other such that the first and second leads may be arranged in an alternating pattern.

The second lead may be longer than the first lead in the length direction.

The second lead may extend from a side of the second cover toward a side of the first cover across a lateral side of the case.

The second lead may include a bent portion over a weld zone protruding from the lateral side of the case.

The first and second leads may be alternately arranged along long-side portions of the first and second covers.

The first and second tab plates may be alternately arranged on the first and second covers along the long-side portions of the first and second covers to connect different pairs of the battery cells, and the first and second leads may extend respectively from the first and second tab plates and may be alternately arranged along the long-side portions of the first and second covers.

The first and second leads may be arranged along first long-side portions of the first and second covers and may not be arranged along second long-side portions of the first and second covers that are opposite the first long-side portions of the first and second covers.

The battery pack may further include a switch device between the second long-side portion of the first cover and the second long-side portion of the second cover.

The case may further include a middle case between the first and second covers, and the battery pack may further include a switch device on the middle case. The switch device may be on the middle case at a position close to the second long-side portions of the first and second covers.

According to one or more embodiments, a battery pack includes: a plurality of battery cells; a case having an accommodation space in which the plurality of battery cells and a cooling fluid to cool the plurality of battery cells are configured to be accommodated; a barrier wall extending across the accommodation space and dividing the accommodation space into an upstream area connected to an inlet of the cooling fluid and a downstream area connected to an outlet of the cooling fluid; and a switch device on a side of the case facing away from the barrier wall.

The barrier wall may include a communication area connecting the upstream area and the downstream area to each other.

The barrier wall may extend along a direction from a first end side of the case to a second end side of the case opposite the first end side, and the inlet and the outlet may be at the first end side, and the communication area may be at the second end side.

The switch device may be on a side of a long-side portion of the case, the long-side portion of the case extending in an extension direction of the barrier wall.

The case may include: first and second covers configured to respectively cover first and second end portions of the battery cells, the first and second end portions of the battery cells being opposite each other in a length direction of the battery cells; and a middle case between the first and second covers.

The inlet, the outlet, and a coupling position of the barrier wall may be at a short-side portion of the middle case, and the switch device may be on a side of a long-side portion of the middle case.

BRIEF DESCRIPTION OF THE DRAWINGS

These and/or other aspects will become apparent and more readily appreciated from the following description of some embodiments, taken in conjunction with the accompanying drawings in which:

FIG. 6 is a view illustrating a flow of a cooling fluid in the case shown in FIG. 5;

DETAILED DESCRIPTION

Figure 1:
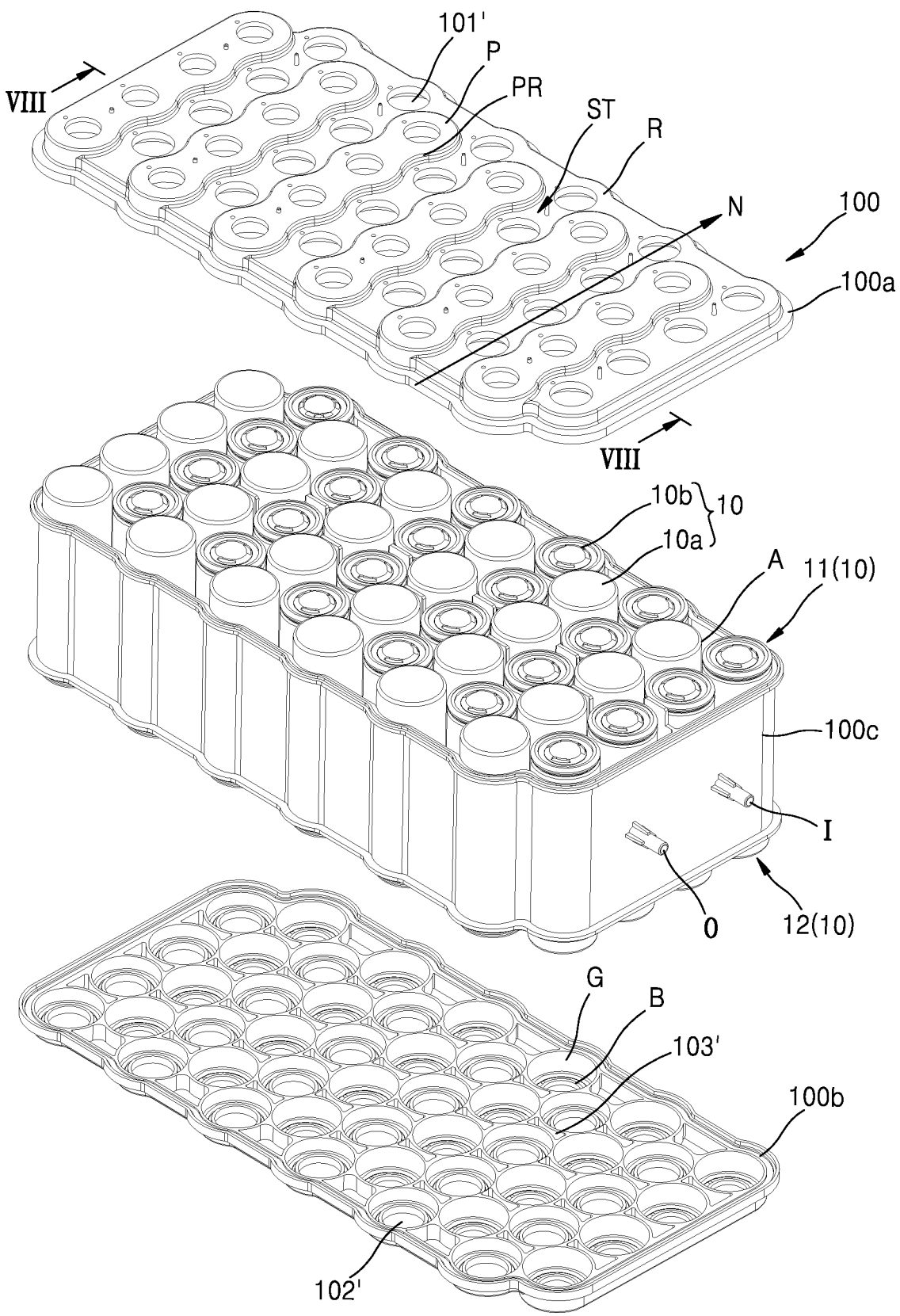
FIG. 1 is an exploded perspective view illustrating a battery pack according to an embodiment of the present disclosure.

Reference will now be made in further detail to some embodiments, examples of which are illustrated in the accompanying drawings, wherein like reference numerals refer to like elements throughout unless otherwise noted. Rather, these embodiments are provided as examples so that this disclosure will be thorough and complete, and will fully convey the aspects and features of the present invention to those skilled in the art. In this regard, the present embodiments may have different forms and should not be construed as being limited to the descriptions set forth herein. Accordingly, the embodiments are merely described below, by referring to the figures, to explain aspects of the present description. Moreover, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section described below could be termed a second element, component, region, layer, or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It is to be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It is to be understood that when an element or layer is referred to as being "on," "connected to," or "coupled to" another element or layer, it can be directly on, connected to, or coupled to the other element or layer, or one or more intervening elements or layers may be present. In addition, it is also to be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It is to be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the present invention belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Battery packs will now be described with reference to the accompanying drawings, in which some embodiments of the present disclosure are shown.

FIG. 1 is an exploded perspective view illustrating a battery pack according to an embodiment of the present disclosure.

Referring to FIG. 1, a battery pack according to an embodiment of the present disclosure may include a plurality of battery cells 10 and a case 100 providing an accommodation space A in which the battery cells 10 and a cooling fluid for cooling the battery cells 10 are accommodated.

The case 100 may include a middle case 100c and first and second covers 100a and 100b facing each other with the middle case 100c therebetween. The first and second covers 100a and 100b may cover first and second end portions 11 and 12 of the battery cells 10 which correspond to both ends of the battery cells 10 in the length direction of the battery cells 10.

First and second terminal holes 101' and 102' may be formed in the first and second covers 100a and 100b to expose the first and second end portions 11 and 12 of the battery cells 10 therethrough, and the battery cells 10 may be electrically connected to each other through the first and second end portions 11 and 12 exposed through the first and second terminal holes 101' and 102'.

Figure 2A:
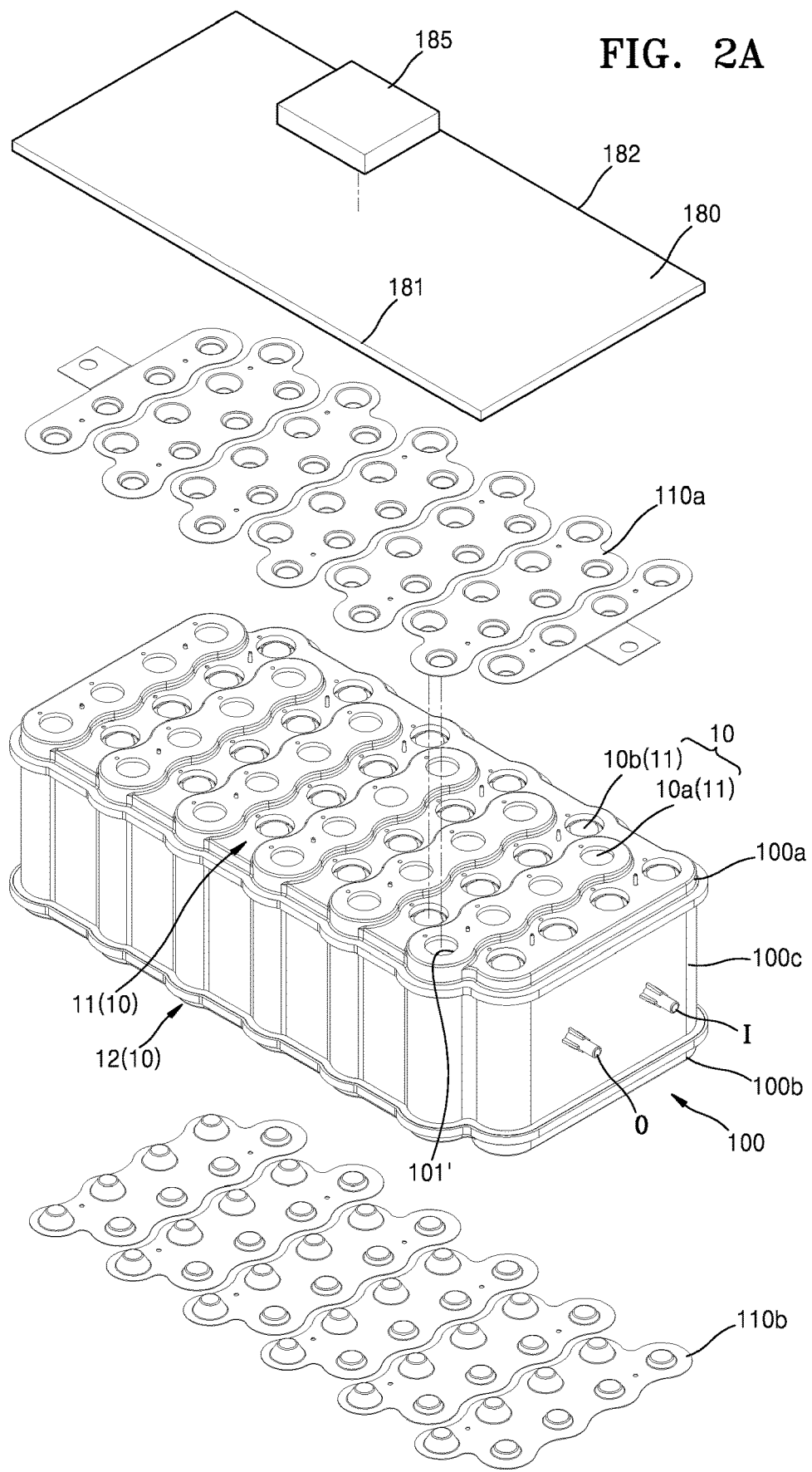
FIGS. 2A and 2B are views illustrating electrical connection between battery cells shown in FIG. 1.
Figure 2B:
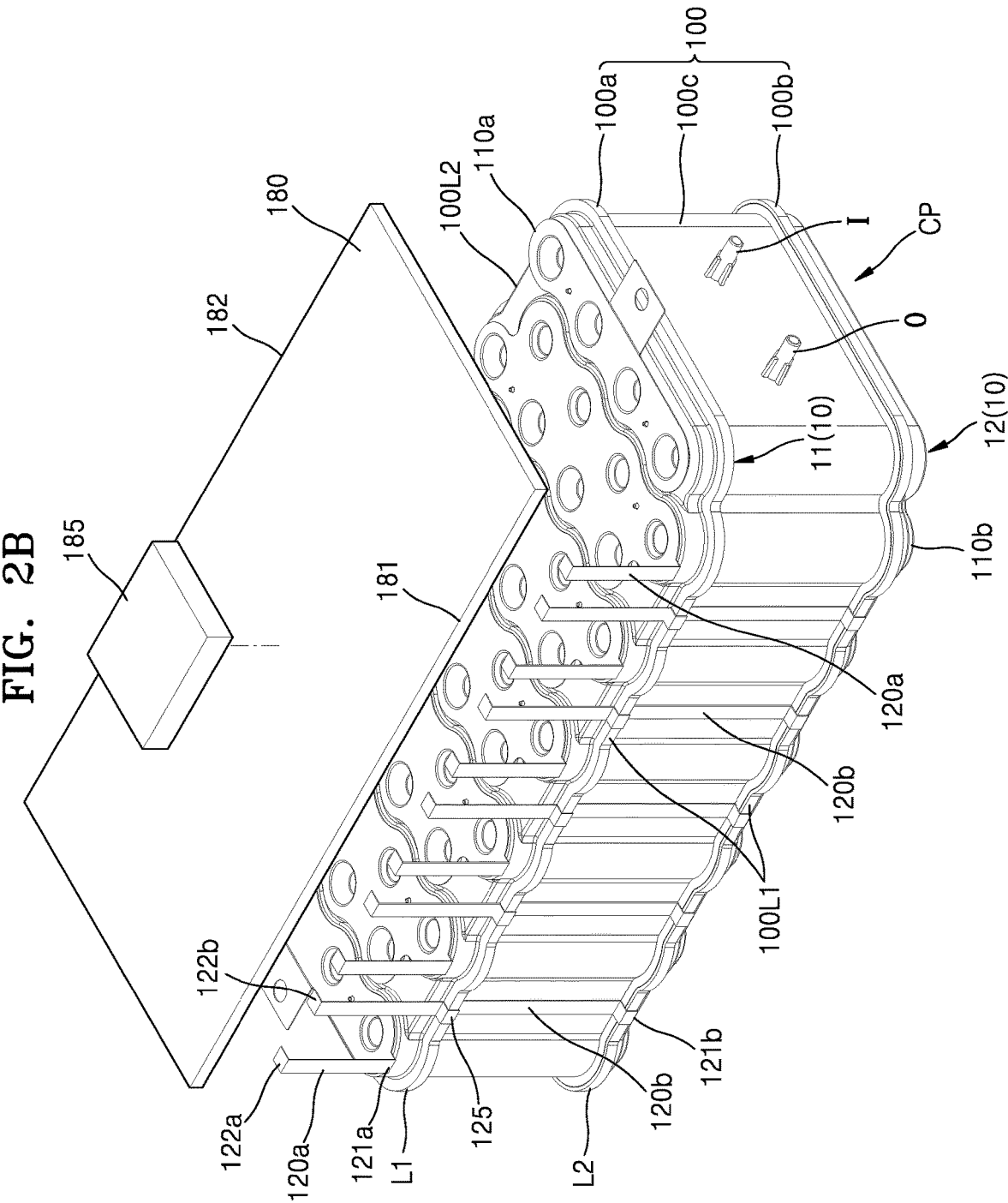

FIGS. 2A and 2B are views illustrating electrical connection between the battery cells 10 shown in FIG. 1.

Referring to FIG. 2A, a first tab plate 110a may be placed on the first cover 100a for electrical connection with the first end portions 11 of the battery cells 10, and a second tab plate 110b may be placed on the second cover 100b for electrical connection with the second end portions 12 of the battery cells 10. A circuit board 180 may be placed on the first tab plate 110a, and the first and second tab plates 110a and 110b may be connected to the circuit board 180.

Referring to FIG. 2B, a first lead 120a may be provided between the circuit board 180 and the first tab plate 110a for electrical connection therebetween, and a second lead 120b may be provided between the circuit board 180 and the second tab plate 110b for electrical connection therebetween. State information about the battery cells 10 transmitted through the first and second tab plates 110a and 110b, such as voltage information, may be transmitted to the circuit board 180 through the first and second leads 120a and 120b for using the information as basic information for controlling charging and discharging operations of the battery cells 10.

The circuit board 180 is placed on the first tab plate 110a and is thus relatively close to the first tab plate 110a and relatively distant from the second tab plate 110b. Therefore, the second lead 120b may extend longer than the first lead 120a. That is, since the second lead 120b extends from the second tab plate 110b placed on the second cover 100b to the circuit board 180 placed above the first cover 100a, the second lead 120b may be longer than the first lead 120a. In an embodiment, the second lead 120b may include bent portions 125 such that the second lead 120b may pass by laser weld zones L1 and L2 while extending across a lateral side of the case 100. Owing to the bent portions 125, the second lead 120b may extend while making tight contact with the lateral side of the case 100 without physical interference with the laser weld zones L1 and L2 protruding from the lateral side of the case 100. Thus, the second lead 120b may be stably supported without electrical interference with the first lead 120a that may otherwise occur if the second lead 120b were to unstably come off the lateral side of the case 100. Here, the case 100 may include: the first and second covers 100a and 100b to cover the first and second end portions 11 and 12 of the battery cells 10; and the middle case 100c placed or located between the first and second covers 100a and 100b. The case 100 may provide the accommodation space A sealed by coupling the middle case 100c and the first and second covers 100a and 100b formed separately from each other. In an embodiment, the laser weld zones L1 and L2 may include first and second laser weld zones L1 and L2 hermetically coupling the first and second covers 100a and 100b to the middle case 100c.

In an embodiment, the first and second leads 120a and 120b may be formed separately from the first and second tab plates 110a and 110b and may then be welded to the first and second tab plates 110a and 110b. For example, coupling portions 121a and 121b may be formed on ends of the first and second leads 120a and 120b for coupling with the first and second tab plates 110a and 110b, respectively, and connection portions 122a and 122b may be formed on the other ends of the first and second leads 120a and 120b for connection with the circuit board 180. In an embodiment of the present disclosure, the coupling portions 121a and 121b formed on the ends of the first and second leads 120a and 120b, and the connection portions 122a and 122b formed on the other ends of the first and second leads 120a and 120b may all be welding portions.

In the case of forming the first and second leads 120a and 120b respectively in one piece with the first and second tab plates 110a and 110b instead of forming the first and second leads 120a and 120b separately from the first and second tab plates 110a and 110b, material costs may increase due to metal scrap remaining after a base metal sheet cutting process. In particular, if the second lead 120b which is relatively long is formed in one piece with the second tab plate 110b, a large amount of metal scrap may remain, and thus material costs may excessively increase. In addition, if a bending process is performed on the second lead 120b independently of the second tab plate 110b, the bending process may be easily performed. Therefore, in an embodiment, at least the second lead 120b may be formed separately from the second tab plate 110b.

In another embodiment of the present disclosure, the first lead 120a having a relatively short length may extend from the first tab plate 110a after being continuously bent from the first tab plate 110a, and the second lead 120b having a relatively long length may be formed separately from the second tab plate 110b and may then be welded to the second tab plate 110b.

The first lead 120a may include a plurality of first leads 120a extending from a plurality of first tab plates 110a. Similarly, the second leads 120b may include a plurality of second leads 120b extending from a plurality of second tab plates 110b. In an embodiment, the first and second leads 120a and 120b may be arranged in an alternating pattern such that the first leads 120a may be placed between the second leads 120b neighboring each other, and the second leads 120b may be placed between the first leads 120a neighboring each other. As described above, since the first and second leads 120a and 120b are arranged in an alternating pattern, electrical interference between the first and second leads 120a and 120b may be prevented or substantially prevented, and electrical insulation may be provided between the first and second leads 120a and 120b.

The first and second leads 120a and 120b may be intensively arranged along first long-side portions 100L1 of the first and second covers 100a and 100b. For example, when the first and second covers 100a and 100b include first and second long-side portions 100L1 and 100L2 opposite each other, the first and second leads 120a and 120b may be intensively arranged along the first long-side portions 100L1 of the first and second covers 100a and 100b but may not be arranged on the second long-side portions 100L2 opposite the first long-side portions 100L1. In this case, the first long-side portions 100L1 of the first and second covers 100a and 100b may make contact with the same lateral side of the case 100, for example, the same lateral side of the middle case 100c.

In an embodiment of the present disclosure, the coupling portions 121a and 121b formed on the ends of the first and second leads 120a and 120b, and the connection portions 122a and 122b formed on the other ends of the first and second leads 120a and 120b may all be welding portions, for example, laser welding portions. In an embodiment, since the first and second leads 120a and 120b are intensively arranged along the first long-side portions 100L1 of the first and second covers 100a and 100b, laser welding workability may be improved, and a laser beam emission position may not be changed from the first long-side portions 100L1 to the second long-side portions 100L2 or the positions of the first and second covers 100a and 100b may not be changed during a laser welding process.

In the embodiment shown in FIG. 2B, a switch device 185 for allowing and blocking the flow of charging and discharging currents may be mounted on the circuit board 180 placed on a side of the first cover 100a. In the present disclosure, the switch device 185 may be placed at any of various positions. For example, in the embodiment shown in FIG. 3A, the switch device 185 may be placed at a side of the second long-side portions 100L2 of the first and second covers 100a and 100b. In such an embodiment, the first and second leads 120a and 120b may be intensively arranged on the first long-side portions 100L1 of the first and second covers 100a and 100b to provide a mounting space for the switch device 185 at a side of the second long-side portions 100L2 of the first and second covers 100a and 100b. For example, the switch device 185 may be placed between the second long-side portion 100L2 of the first cover 100a and the second long-side portion 100L2 of the second cover 100b. For example, the switch device 185 may be placed on the middle case 100c at a side of the second long-side portions 100L2 to more efficiently dissipate heat from heat generating components such as the switch device 185. This will be described further later.

In an embodiment of the present disclosure, the first tab plates 110a may connect in series first end portions 11 of first and second battery cells 10a and 10b having opposite polarities, and the second tab plates 110b may connect in series second end portions 12 of the first and second battery cells 10a and 10b having opposite polarities. In this case, the first and second tab plates 110a and 110b may be arranged in a zigzag pattern on the first and second covers 100a and 100b to connect different pairs of the first and second battery cells 10a and 10b, and, thus, the first and second leads 120a and 120b extending from the first and second tab plates 110a and 110b may also be arranged in an alternating pattern. For example, the first and second tab plates 110a and 110b may be alternately arranged along the first long-side portions 100L1 of the first and second covers 100a and 100b, and the first and second leads 120a and 120b extending from the first and second tab plates 110a and 110b may be alternately arranged along the first long-side portions 100L1 of the first and second covers 100a and 100b.

In an embodiment, since the first and second leads 120a and 120b are arranged along the first long-side portions 100L1 of the first and second covers 100a and 100b, the connection portions 122a and 122b forming end portions of the first and second leads 120a and 120b may be connected to a first side portion 181 of the circuit board 180. That is, the connection portions 122a and 122b of the first and second leads 120a and 120b may be arranged in a row along the first side portion 181 of the circuit board 180. The expression "the connection portions 122a and 122b of the first and second leads 120a and 120b are arranged in a row" may mean that the connection portions 122a and 122b of the first and second leads 120a and 120b are arranged in one direction along the first side portion 181 of the circuit board 180 without overlapping each other. Here, the first side portion 181 of the circuit board 180 may correspond to an edge portion of the circuit board 180 extending straight and continuously in one direction but may not include edge portions extending in different directions. In an embodiment of the present disclosure, the first and second leads 120a and 120b may be intensively connected to the first side portion 181 of the circuit board 180 but may not be connected to a second side portion 182 of the circuit board 180 opposite the first side portion 181.

As described above, in an embodiment, since the connection portions 122a and 122b of the first and second leads 120a and 120b are intensively connected to the first side portion 181 of the circuit board 180, a conductive path of the circuit board 180 connected to the first and second leads 120a and 120b may be shortened. For example, the conductive path may be shortened by placing a circuit for processing data transmitted through the first and second leads 120a and 120b at a position close to the first side portion 181 of the circuit board 180.

In an embodiment, the connection portions 122a and 122b of the first and second leads 120a and 120b may be arranged in an alternating pattern along the first side portion 181 of the circuit board 180. Since the first and second leads 120a and 120b are arranged in an alternating pattern, the connection portions 122a and 122b forming end portions of the first and second leads 120a and 120b may be arranged in an alternating pattern along the first side portion 181 of the circuit board 180.

The circuit board 180 may receive information about states of the battery cells 10 through the first and second leads 120a and 120b and may control charging and discharging operations of the battery cells 10 based on the state information. The circuit board 180 may be provided on the first tab plates 110a on a side of the first cover 100a. That is, the circuit board 180 may be provided on a side of the first cover 100a instead of being provided on a side of the middle case 100c. Although not shown in the drawings, according to an embodiment of the present disclosure, an insulative member may be placed between the first tab plates 110a and the circuit board 180 to provide insulation therebetween.

In an embodiment, the first tab plates 110a may be directly connected to the first end portions 11 of the battery cells 10 making contact with the cooling fluid and may be in thermal contact with the cooling fluid through the first cover 100a with which the first tab plates 110a make tight contact.

Thus, the circuit board 180 placed on the first tab plates 110*a* may be cooled through the first tab plates 110*a*. Like the first tab plates 110*a*, the second tab plates 110*b* may be directly connected to the second end portions 12 of the battery cells 10 making contact with the cooling fluid and may be in thermal contact with the cooling fluid through the second cover 100*b* with which the second tab plates 110*b* make tight contact.

According to the present disclosure, the first and second tab plates 110*a* and 110*b* at which heat may be intensively generated due to concentration of charging and discharging currents may be cooled using the cooling fluid flowing in the case 100. Therefore, the temperature of the first and second tab plates 110*a* and 110*b* may be lowered to decrease the electrical resistance of charging and discharging paths, and circuit components mounted on the circuit board 180 may be cooled through the first tab plates 110*a*. For example, one or a plurality of switch devices 185 may be arranged on the circuit board 180 to allow and block the flow of charging current and/or discharging current in the charging and discharging paths, and a large amount of heat may be generated when the switch devices 185 are turned on and off. In an embodiment of the present disclosure, the case 100 may accommodate the plurality of battery cells 10 together with the cooling fluid, and the cooling fluid accommodated in the case 100 may dissipate heat from the plurality of battery cells 10 and heat generating components, such as the switch device 185 as well. As described later, the cooling fluid may refer to a liquid cooling medium having high thermal capacity and high heat-dissipating performance compared to a gas cooling medium, such as air. For example, as the switch device 185 makes contact with ambient air having a relatively low temperature at the outside of the case 100, some heat may be dissipated from the switch device 185. However, a larger amount of heat may be dissipated from the switch device 185 through the cooling fluid flowing in the case 100. In an embodiment of the present disclosure, the switch device 185 may include a solid state switch, such as a relay device or a field effect transistor (FET). In an embodiment of the present disclosure shown in FIG. 2B, the switch device 185 may be placed on a side of the first cover 100*a* above the first tab plates 110*a* and may be thermally connected to the cooling fluid through the first tab plates 110*a*. For example, since the switch device 185 is thermally connected to the cooling fluid through metal plates having high thermal conductivity such as the first tab plates 110*a*, dissipation of heat from heat generating components such as the switch device 185 may be facilitated.

Figure 3A:
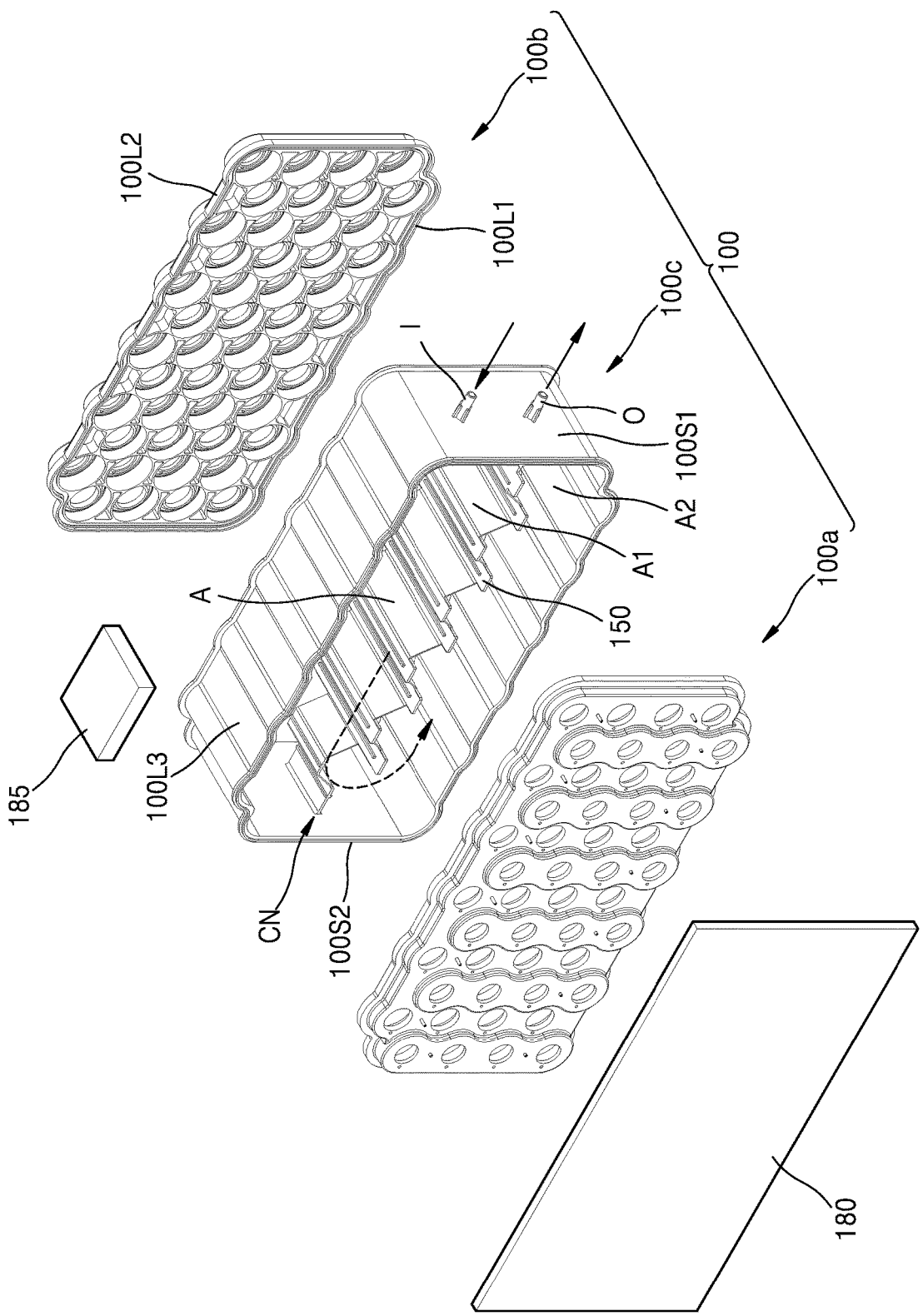
FIGS. 3A and 3B are views illustrating a structure for cooling a switch device according to an embodiment of the present disclosure.
Figure 3B:
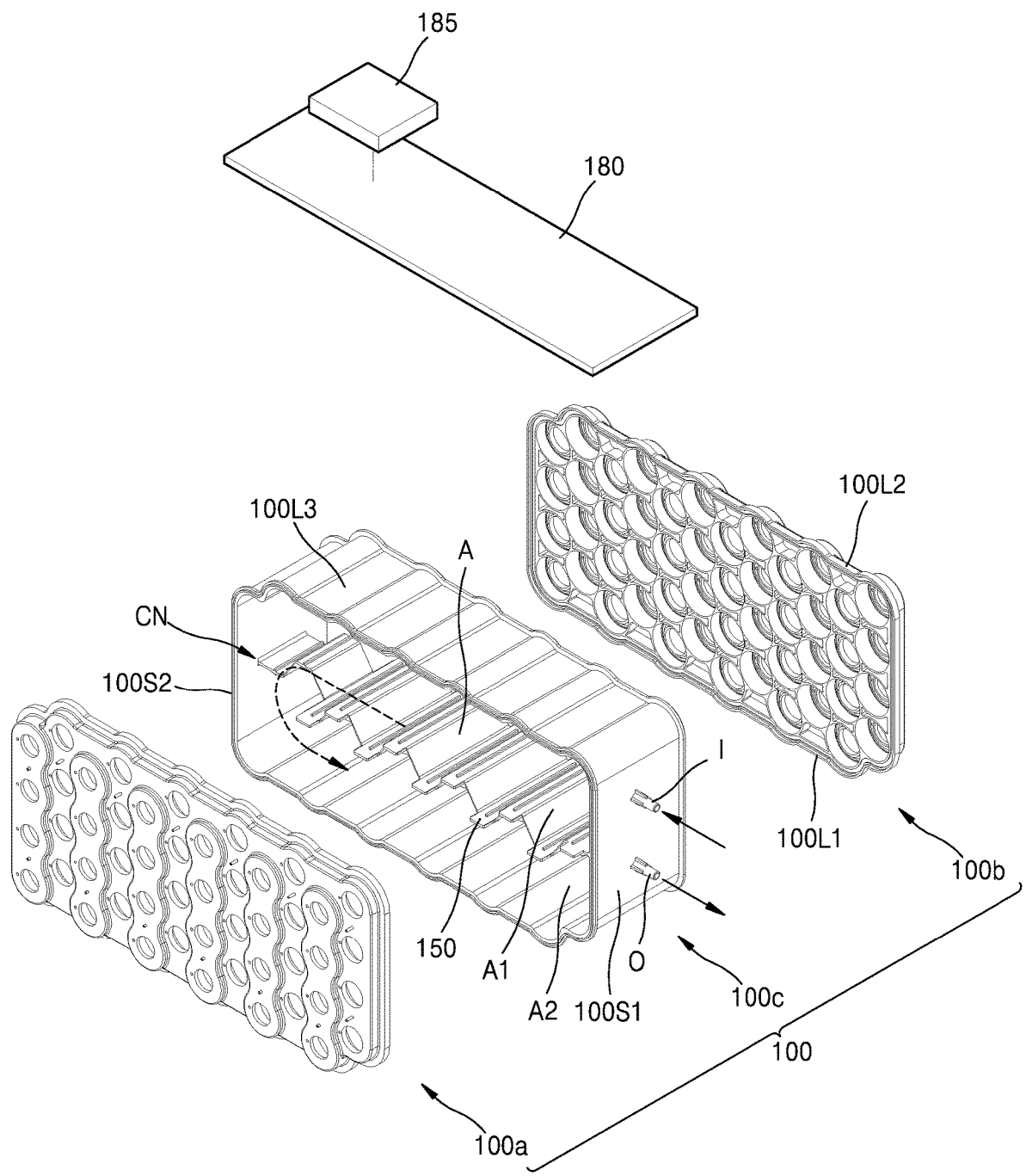

FIGS. 3A and 3B are views illustrating a structure for cooling the switch device 185 according to an embodiment of the present disclosure.

Referring to FIGS. 3A and 3B, the case 100 may accommodate a flow of the cooling fluid for cooling the battery cells 10, and a barrier wall 150 may be provided in the case 100 across the accommodation space A to divide the accommodation space A into an upstream area A1 connected to an inlet I of the cooling fluid and a downstream area A2 connected to an outlet O of the cooling fluid.

The inlet I and the outlet O of the cooling fluid may be formed in an end side (a first short-side portion 100S1) of the case 100 in an extension direction of the barrier wall 150, and a communication area CN connecting the upstream area A1 and the downstream area A2 to each other may be formed at the other end side (a second short-side portion 100S2) of the case 100 in the extension direction of the barrier wall 150. In this case, the flow of the cooling fluid introduced into the case 100 through the inlet I provided in the end side of the case 100 may be reversed at a position near the communication area CN provided on the other end side of the case 100 and may then be directed to the outside of the case 100 through the outlet O provided in the end side of the case 100, thereby forming a U-turn path.

The cooling fluid flowing along the barrier wall 150 from the end side (the first short-side portion 100S1) in which the inlet I and the outlet O are formed toward the other end side (the second short-side portion 100S2) on which the communication area CN is formed may form a flow concentrated on an inner wall of the case 100 under the influence of centrifugal force at the communication area CN, and the flow direction of the cooling fluid may be reversed by pressure applied from the inner wall of the case 100. In this case, a side of the case 100 facing the barrier wall 150, for example, the middle case 100*c* extending substantially in parallel to the barrier wall 150, may make contact with the cooling fluid at high pressure and may thus provide relatively high heat-dissipating performance. In an embodiment of the present disclosure, heat generating components, such as the switch device 185, may be arranged on the side of the case 100 facing the barrier wall 150, that is, on the middle case 100*c*, such that the switch device 185 may be more effectively cooled through the middle case 100*c* on which the flow of the cooling fluid is concentrated. In addition, since the middle case 100*c* provides a heat-dissipating path, the switch device 185 and the cooling fluid may be thermally connected to each other. In an embodiment, as shown in FIG. 3A, the switch device 185 may be placed on a side of the middle case 100*c*, and the circuit board 180 may be placed on a side of the first cover 100*a*. In another embodiment, as shown in FIG. 3B, the switch device 185 and the circuit board 180 on which the switch device 185 is mounted may be placed on a side of the middle case 100*c*.

The middle case 100*c* may form a large contact area with the cooling fluid at a position most distant from the barrier wall 150 while making contact with the cooling fluid at high pressure owing to the centrifugal force of the cooling fluid. For example, compared to an embodiment in which the switch device 185 is placed on a side of the first cover 100*a* as shown in FIG. 2B, since the middle case 100*c* forms a large contact area with the cooling fluid while making contact with the cooling fluid at high pressure owing to the centrifugal force of the cooling fluid, heat may be more efficiently dissipated.

According to an embodiment of the present disclosure, the case 100 may be divided into three parts: the first and second covers 100*a* and 100*b* and the middle case 100*c*. In this case, the first and second covers 100*a* and 100*b* may cover the first and second end portions 11 and 12 of the battery cells 10, respectively, and the middle case 100*c* may cover most lengths of the battery cells 10. That is, the middle case 100*c* may make contact with the cooling fluid with a larger contact area than the contact area between the cooling fluid and the covers 100*a* and 100*b*, and thus heat may be efficiently dissipated from heat generating components, such as the switch device 185.

In an embodiment, the switch device 185 may be placed on a long-side portion 100L3 of the middle case 100*c* facing the barrier wall 150 and extending in the extension direction of the barrier wall 150. The long-side portion 100L3 of the middle case 100*c* may provide a larger heat-dissipating area than the short-side portions of the case 100 (the first and second short-side portions 100S1 and 100S2 of the case 100) and a large mounting area in which the switch device 185 may be easily mounted. The inlet I and the outlet O of the cooling fluid may be formed in a short-side portion of the middle case 100c (the first short-side portion 100S1 of the case 100), and, thus, the switch device 185 may be placed on the long-side portion 100L3 of the middle case 100c to avoid physical interference with these structures.

The long-side portion 100L3 of the middle case 100c may be formed in the extension direction of the barrier wall 150 between the first and second short-side portions 100S1 and 100S2 of the case 100 to guide the flow of the cooling fluid and may make contact with the cooling fluid with a large contact area and high pressure.

The middle case 100c may include a pair of long-side portions 100L3 extending between the first and second short-side portions 100S1 and 100S2 of the case 100. In an embodiment, the long-side portion 100L3 of the middle case 100c on which the switch device 185 is mounted may be close to the second long-side portions 100L2 of the first and second covers 100a and 100b. Referring to FIG. 2B, as described above, in an embodiment, the first and second leads 120a and 120b connected to the first and second tab plates 110a and 110b are intensively arranged along the first long-side portions 100L1 of the first and second covers 100a and 100b, and, thus, the switch device 185 may be placed on a long-side portion close to the second long-side portions 100L2 of the first and second covers 100a and 100b to avoid electrical interference with the first and second leads 120a and 120b. In an embodiment, the long-side portion 100L3 of the middle case 100c on which the switch device 185 is mounted may be closer to the inlet I through which the cooling fluid is introduced at a relatively low temperature than to the outlet O through which the cooling fluid is discharged at a relatively high temperature, that is, may be closer to the upstream area A1 connected to the inlet I than to the downstream area A2 connected to the outlet O.

In an embodiment of the present disclosure, the switch device 185 may be placed at a position close to one of the first and second short-side portions 100S1 and 100S2 of the case 100 along the long-side portion 100L3 of the middle case 100c. The switch device 185 may allow and block the flow of charging and discharging currents in the charging and discharging paths, and, thus, the switch device 185 may be placed at a position close to one of the first and second short-side portions 100S1 and 100S2 of the case 100 along the long-side portion 100L3 of the middle case 100c, such that the switch device 185 may be close to an output terminal PE1 or PE2 (refer to FIG. 4).

For example, the switch device 185 may be placed on the long-side portion 100L3 of the middle case 100c at a position close to the second short-side portion 100S2 adjacent to the communication area CN. In other words, the switch device 185 may be placed at a position close to the second short-side portion 100S2 opposite the first short-side portion 100S1 in which the inlet I and the outlet O are formed. Since the middle case 100c may make contact with the cooling fluid with high pressure near the communication area CN by the centrifugal force of the cooling fluid, the switch device 185 may be placed on the middle case 100c near the communication area CN, that is, at a position close to the second short-side portion 100S2 near the communication area CN. In an embodiment, as shown in FIG. 3B, the switch device 185 and the circuit board 180 on which the switch device 185 is mounted may be placed on the long-side portion 100L3 of the middle case 100c. In an embodiment, although the circuit board 180 is placed at a center position along the long-side portion 100L3 of the middle case 100c, the switch device 185 mounted on the circuit board 180 may be placed at a position close to the second short-side portion 100S2. In an embodiment of the present disclosure, the circuit board 180 may be arranged along the long-side portion 100L3 of the middle case 100c at a position closer to the second short-side portion 100S2 than to the first short-side portion 100S1. In this case, a plurality of circuit devices including the switch device 185 may be arranged on the circuit board 180, and, thus, heat may be more efficiently dissipated from the plurality of circuit devices depending on the position design of the circuit board 180. Although not shown in the drawings, in an embodiment, the switch device 185 may be placed along the long-side portion 100L3 of the middle case 100c at a position close to the first short-side portion 100S1 of the case 100 in which the inlet I introducing the cooling fluid at a relatively low temperature is formed.

In the embodiments shown in FIGS. 3A and 3B, heat generating components, such as the switch device 185, are arranged on a side of the middle case 100c other than the first tab plates 110a on which charging and discharging currents are concentrated to cause a relatively great heat-dissipating burden, thereby distributing the burden of dissipating heat from the first tab plates 110a and the switch device 185 to different positions of the case 100 and preventing or substantially preventing electrical interference therebetween.

Figure 4:
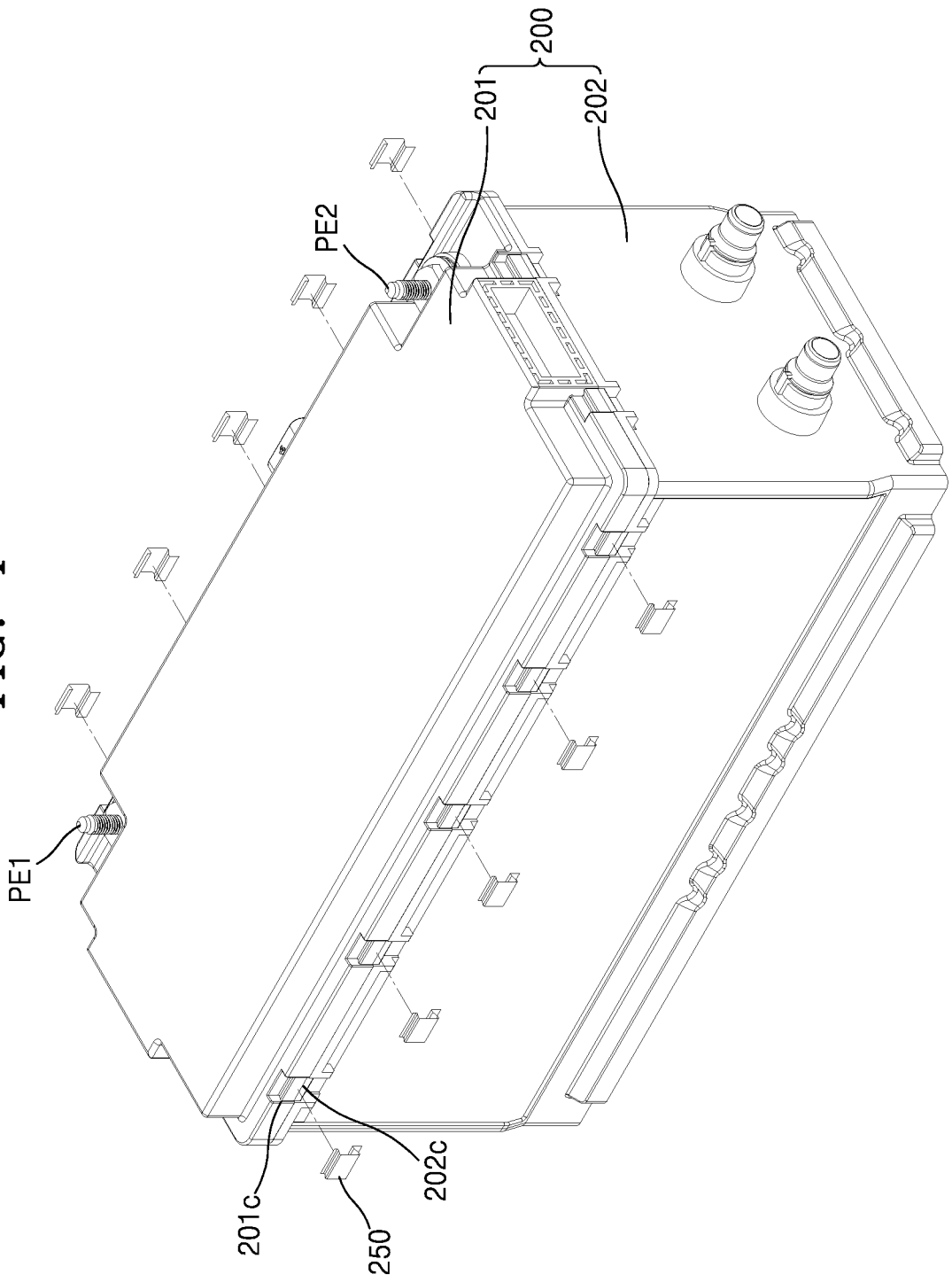
FIG. 4 is an exploded perspective view illustrating a housing accommodating a core pack shown in FIG. 2B, according to an embodiment of the present disclosure.

FIG. 4 is an exploded perspective view illustrating a housing 200 accommodating a core pack CP shown in FIG. 2B, according to an embodiment of the present disclosure.

Referring to FIGS. 2B and 4, according to an embodiment of the present disclosure, the battery pack may include: the core pack CP including the case 100 in which the plurality of battery cells 10 are accommodated, the circuit board 180 being mounted on an outside of the core pack CP; and the housing 200 accommodating the core pack CP. In addition, the housing 200 may include a housing main body 202 and a housing cover 201 that face each other and are coupled to each other with the core pack CP therebetween.

In an embodiment, the housing main body 202 and the housing cover 201 may include different materials. For example, the housing main body 202 may include a metallic material, such as aluminum, and the housing cover 201 may include a resin material for injection molding. The housing main body 202 and the housing cover 201 may be coupled to each other in a mutually-facing direction with the core pack CP therebetween. For example, the housing main body 202 and the housing cover 201 including different materials may be coupled to each other by a clipping structure. That is, clip recesses 201c and 202c to which clips 250 may be fitted may be formed in the housing cover 201 and the housing main body 202, and after aligning the clip recesses 201c and 202c of the housing cover 201 and the housing main body 202 with each other, the clips 250 may be fitted to the clip recesses 201c and 202c adjoining each other to couple the housing cover 201 and the housing main body 202 to each other.

The housing main body 202 provides a space in which the core pack CP is entirely or mostly accommodated, and the housing cover 201 covers an upper portion of the housing main body 202 to seal the space. In an embodiment, the housing main body 202 may include a metallic material, such as aluminum or an aluminum alloy, to provide structural rigidity of the battery pack and heat-dissipating performance, and an electric device packed with an insulative material such as the switch device 185 (refer to FIG. 2B) packed with an insulative resin may be placed on a side of the circuit board 180 facing a lateral side of the housing main body 202 for electrical insulation between the circuit board 180 and the housing main body 202. According to an embodiment of the present disclosure, the core pack CP shown in FIG. 2B may be accommodated in the housing main body 202 in a state such that the circuit board 180 may face a lateral side of the housing main body 202, and, in this case, the circuit board 180 and the housing main body 202 may be insulated from each other owing to the switch device 185 (refer to FIG. 2B) placed between the circuit board 180 and the lateral side of the housing main body 202.

Figure 5:
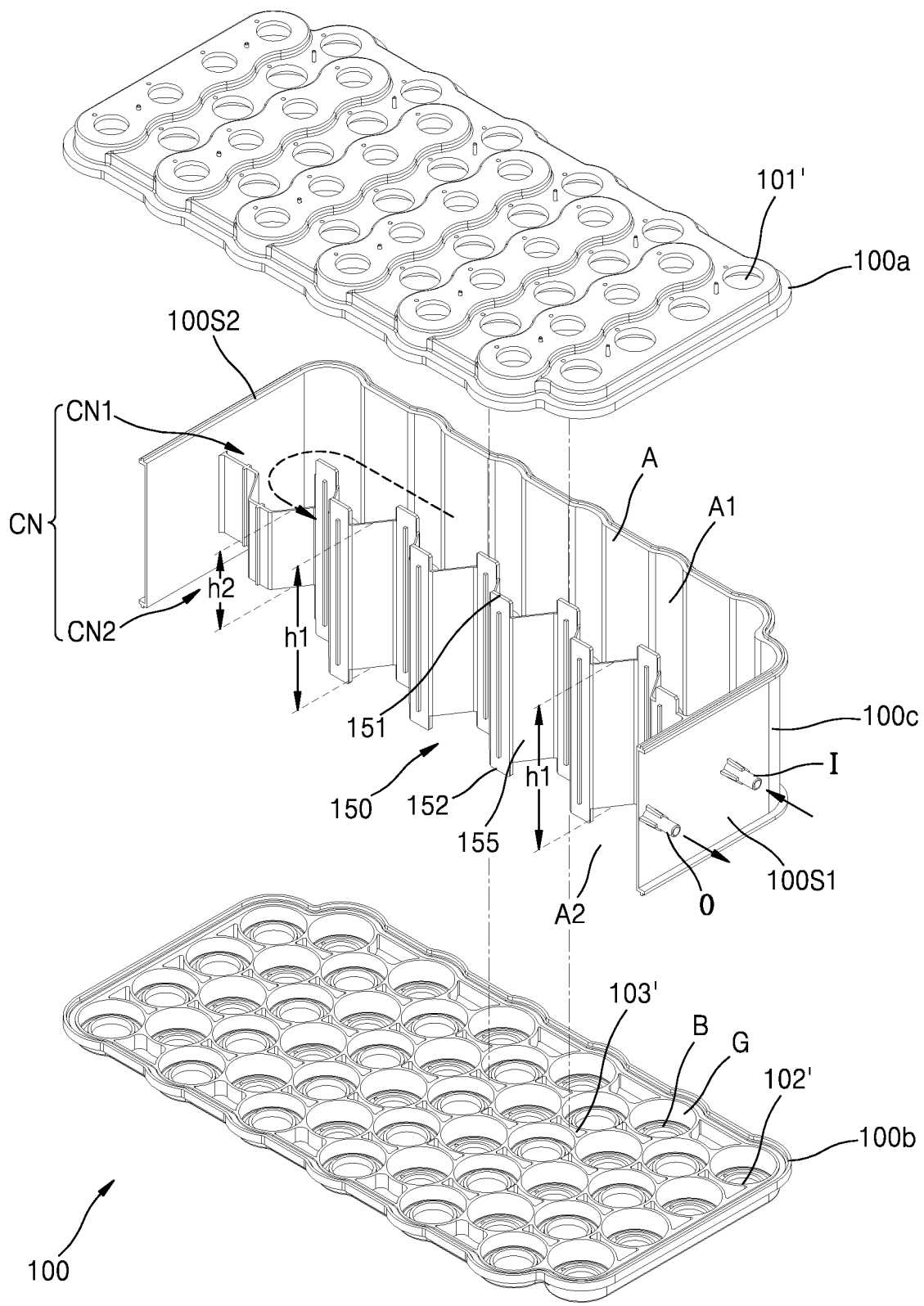
FIG. 5 is an exploded perspective view illustrating a case shown in FIG. 1.

FIG. 5 is an exploded perspective view illustrating the case 100 shown in FIG. 1; and FIG. 6 is a view illustrating a flow of the cooling fluid in the case 100 shown in FIG. 5.

The case 100 may be formed in a configuration divided into three parts, that is, the middle case 100c and the first and second covers 100a and 100b, and may provide the accommodation space A sealed by coupling the middle case 100c and the first and second covers 100a and 100b to each other. In an embodiment, the middle case 100c and the first and second covers 100a and 100b may be coupled to each other by a laser welding method. Thus, the first laser weld zone L1 (refer to FIG. 2B) may be formed along a boundary between the middle case 100c and the first cover 100a, and the second laser weld zone L2 (refer to FIG. 2B) may be formed along a boundary between the middle case 100c and the second cover 100b. Since the case 100 is formed in a shape divided into three parts, that is, the middle case 100c and the first and second covers 100a and 100b, laser welding may be performed on close positions of the upper and lower portions of the battery pack while adjusting the welding positions in such a manner that the welding positions may be easily exposed to a laser beam emitted in an oblique direction toward the upper and lower portions of the battery pack. Thus, welding may be easily performed.

In an embodiment, the middle case 100c and the first and second covers 100a and 100b may be formed by an injection molding method and may include an engineering plastic material for injection molding and laser welding. For example, the middle case 100c and the first and second covers 100a and 100b may include a polyamide-based material including glass fiber. For example, as optical conditions for performing a laser welding process on a stack of two base materials, a base material which is relatively close in a laser beam emission direction is required to have transmittance to laser beams within a range of a certain value or greater, and the other base material which is relatively distant in the laser beam emission direction is required to have laser beam absorptivity within a range of a certain value or greater. In an embodiment, the middle case 100c and the first and second covers 100a and 100b may include a polyamide-based material including glass fiber that satisfies the optical conditions.

Referring to FIGS. 1 and 5, guide ribs G may be formed on the second cover 100b. The guide ribs G may define assembling positions of the battery cells 10 and may protrude from the second cover 100b toward the second end portions 12 of the battery cells 10 to surround the second end portions 12 of the battery cells 10. Like the guide ribs G formed on the second cover 100b, guide ribs G may also be formed on the first cover 100a to define the assembling positions of the battery cells 10. The guide ribs G of the first cover 100a may protrude from the first cover 100a toward the first end portions 11 of the battery cells 10 to surround the first end portions 11 of the battery cells 10. The guide ribs G of the first and second covers 100a and 100b may respectively surround the first and second end portions 11 and 12 of the same battery cells 10 to delimit the assembling positions of the battery cells 10, and may thus be formed at positions corresponding to each other.

In an embodiment, gap portions 103' may be formed between the guide ribs G. For example, each of the gap portions 103' may be provided in a surplus space among four neighboring guide ribs G having adjacent peripheries. As described later, the gap portions 103' may provide coupling positions when a barrier wall 150 is installed in the case 100. For example, the gap portions 103' of the first and second covers 100a and 100b may be formed at positions corresponding to each other to provide coupling positions to the barrier wall 150 in the case 100. Further aspects of the guide ribs G and the gap portions 103' will be described later.

The first and second covers 100a and 100b may cover the first and second end portions 11 and 12 of the battery cells 10, and the middle case 100c may cover most of the length of the battery cells 10. That is, the middle case 100c may be longer than the first and second covers 100a and 100b in the length direction of the battery cells 10. The middle case 100c may define the accommodation space A while surrounding the peripheries of the battery cells 10 and may be formed in one piece with the barrier wall 150 provided inside the accommodation space A. In an embodiment, the middle case 100c and the barrier wall 150 may be formed in one piece by an injection molding method.

Referring to FIGS. 5 and 6, the case 100 may accommodate a flow of the cooling fluid for cooling the battery cells 10, and the barrier wall 150 may be provided in the case 100 across the accommodation space A to divide the accommodation space A into the upstream area A1 and the downstream area A2. The upstream area A1 may be connected to the inlet I of the cooling fluid such that the cooling fluid may be introduced into the upstream area A1 at a relatively low temperature, and the downstream area A2 may be connected to the outlet O of the cooling fluid such that the cooling fluid may be discharged from the downstream area A2 at a relatively high temperature. The inlet I and the outlet O of the cooling fluid may be formed in an end side in the extension direction of the barrier wall 150, and the communication area CN connecting the upstream area A1 and the downstream area A2 to each other may be formed at the other end side in the extension direction of the barrier wall 150. The communication area CN may connect the upstream area A1 and the downstream area A2 to each other such that a flow of the cooling fluid from the inlet I of the end side to the other end side in the upstream area A1 may be reversed like a U-turn to form a flow of the cooling fluid from the other end side toward the outlet O in the downstream area A2.

The inlet I and the outlet O may be formed in an end side in the extension direction of the barrier wall 150. For example, both the inlet I and the outlet O may be formed in the first short-side portion 100S1 of the case 100. As described above, in an embodiment, the inlet I and the outlet O are formed together in the first short-side portion 100S1 of the case 100, for example, instead of being formed respectively in the first and second short-side portions 100S1 and 100S2 of the case 100 opposite each other. Therefore, fluid connection in the case 100 may be easily made. For example, the case 100 may include: a pair of long-side portions parallel to the extension direction of the barrier wall 150; and the first and second short-side portions 100S1 and 100S2 connecting the pair of long-side portions, and the inlet I and the outlet O may be formed in the first short-side portion 100S1. That is, the inlet I and the outlet O may not be formed in the second short-side portion 100S2 opposite the first short-side portion 100S1.

In embodiments of the present disclosure, the inlet I and the outlet O are formed in the first short-side portion 100S1, and the flow of the cooling fluid is reversed like a U-turn at a side of the second short-side portion 100S2 to connect the flow of the cooling fluid from the inlet I to the outlet O using the barrier wall 150. Therefore, relatively large resistance may be applied to the flow of the cooling fluid, and thus the flow of the cooling fluid may be adjusted such that the inside (the accommodation space A) of the case 100 may be fully or almost fully filled with the cooling fluid. Unlike this, if sufficient resistance is not applied to the flow of the cooling fluid, for example, if the cooling fluid flows in one direction from the first short-side portion 100S1 to the second short-side portion 100S2 of the case 100, the cooling fluid may flow without filling a remote portion such as an upper or corner portion of the case 100 to cause insufficient cooling.

According to embodiments of the present disclosure, the accommodation space A for the battery cells 10 is divided into two parts: the upstream area A1 connected to the inlet I of the cooling fluid, and the downstream area A2 connected to the outlet O of the cooling fluid. Therefore, a cross-sectional area (an area from which heat is to be dissipated) through which the cooling fluid flows may be about one half of the cross-sectional area of the accommodation space A, and, thus, the heat-dissipating performance of the cooling fluid may be improved. Unlike this, if the cooling fluid flows in one direction from the first short-side portion 100S1 to the second short-side portion 100S2 of the case 100, the cross-sectional area (the area from which heat is to be dissipated) through which the cooling fluid flows may be equal to the cross-sectional area of the accommodation space A. Thus, to reduce, by half, the cross-sectional area (the area from which heat is to be dissipated) through which the cooling fluid flows, the pair of the inlet I and the outlet O may be provided to each of the first and second short-side portions 100S1 and 100S2. This may complicate a cooling fluid connection structure and increase the possibility of leakage of the cooling fluid.

In various embodiments of the present disclosure, inlets I and outlets O may be distributed to the first and second short-side portions 100S1 and 100S2 in different numbers. For example, two or more inlets I and two or more outlets O may be distributed to the first and second short-side portions 100S1 and 100S2. For example, two or more barrier walls 150 may be provided, and the inlet I and the outlet O may be provided in each of regions divided by the two or more barrier walls 150. That is, two or more inlets I and two or more outlets O may be formed, and, in this case, the number of the inlets I and the number of the outlets O may be different. However, in the embodiment shown in FIG. 5, the inlet I and the outlet O are formed in the first short-side portion 100S1. That is, one inlet I and one outlet O are provided as a pair. In this case, as described above, fluid connection in the case 100 may be easily made, and insufficient cooling may be prevented or substantially prevented in a remote region of the case 100, such as an upper or corner region. In addition, the cross-sectional area (the area from which heat is to be dissipated) through which the cooling fluid flows may be reduced, and, thus, the heat-dissipating performance of the cooling fluid may be improved.

Referring to FIG. 6, the guide ribs G (or the battery cells 10) may be arranged in rows in the extension direction of the barrier wall 150, and, in this case, the barrier wall 150 may extend across a gap between first and second rows R1 and R2 neighboring each other to divide the rows of the guide ribs G (or the battery cells 10) into two equal groups.

In an embodiment of the present disclosure, the guide ribs G (or the battery cells 10) may be arranged in eight rows in the extension direction of the barrier wall 150, and, in this case, the barrier wall 150 may divide the eight rows into two equal groups, each including four rows to form the upstream area A1 and the downstream area A2. In this manner, the number of battery cells 10 included in the upstream area A1 is adjusted to be approximately equal to the number of battery cells 10 included in the downstream area A2 such that the heat-dissipating burden on the cooling fluid may be equally distributed in the upstream area A1 and the downstream area A2.

The barrier wall 150 may extend across the gap between the first and second rows R1 and R2 that are adjacent to each other in a state in which the guide ribs G (or the battery cells 10) of the first row R1 are inserted between the guide ribs G (or the battery cells 10) of the second row R2, and, thus, the barrier wall 150 may extend while meandering across the gap between the first and second rows R1 and R2. For example, the barrier wall 150 may extend in a zigzag pattern along outer surfaces of the guide ribs G (or the battery cells 10) of the first and second rows R1 and R2, and, thus, the barrier wall 150 may include a plurality of bent portions.

Referring to FIG. 5, in an embodiment, the barrier wall 150 may include: a main portion 155 extending across the accommodation space A; and first and second coupling portions 151 and 152 arranged from one end to the other end of the barrier wall 150 in the extension direction of the main portion 155 and protruding toward the first and second covers 100a and 100b at intermittent positions. The first and second coupling portions 151 and 152 may be coupled to the gap portions 103' of the first and second covers 100a and 100b.

In an embodiment, the second coupling portions 152 may protrude from the main portion 155 of the barrier wall 150 and make contact with the gap portions 103' of the second cover 100b, and the second coupling portions 152 and the gap portions 103' of the second cover 100b making contact with each other may be welded to each other by a laser welding method. Thus, weld zones may be formed on the gap portions 103' of the second cover 100b as a result of welding of the second coupling portions 152. Similarly, the first coupling portions 151 may protrude from the main portion 155 of the barrier wall 150 and make contact with the gap portions 103' of the first cover 100a, and the first coupling portions 151 and the gap portions 103' of the first cover 100a making contact with each other may be welded to each other by a laser welding method. Thus, weld zones may be formed on the gap portions 103' of the first cover 100a as a result of welding of the first coupling portions 151. The first and second coupling portions 151 and 152 may be arranged at positions corresponding to each other in the extension direction of the barrier wall 150 and may be coupled to the gap portions 103' of the first and second covers 100a and 100b corresponding to the first and second coupling portions 151 and 152.

In an embodiment, the barrier wall 150 may be formed in one piece with the middle case 100c. For example, the barrier wall 150 and the middle case 100c may be formed together by an injection molding method. In this case, the first and second coupling portions 151 and 152 may protrude from the middle case 100c and may be coupled respectively to the gap portions 103' of the first and second covers 100a and 100b.

The main portion 155 of the barrier wall 150 may have different first and second heights h1 and h2 along the extension direction of the barrier wall 150. The main portion 155 of the barrier wall 150 may have the first height h1 along most of the length of the barrier wall 150 from the end side (the first short-side portion 100S1) in which the inlet I and the outlet O are formed, and may define the upstream area A1 and the downstream area A2 between the first and second covers 100a and 100b. To form the communication area CN connecting the upstream area A1 and the downstream area A2 to each other at the other end side (the second short-side portion 100S2) opposite the end side in which the inlet I and the outlet O are formed, the main portion 155 of the barrier wall 150 may have the second height h2 at the other end side (the second short-side portion 100S2) which is less than the first height h1 at the end side (the first short-side portion 100S1). Thus, the communication area CN corresponding to the difference between the first and second heights h1 and h2 may be formed. That is, the main portion 155 of the barrier wall 150 may be stepped from the first height h1 at the end side to the second height h2 at the other end side, and the communication area CN may correspond to the difference between the first and second heights h1 and h2.

As the ratio of the second height h2 to the first height h1 increases, the difference between the first and second heights h1 and h2 decreases, and the size of the communication area CN decreases, thereby increasing resistance to the flow of the cooling fluid and decreasing the velocity of the flow of the cooling fluid. However, the mechanical rigidity of the barrier wall 150 increases. Conversely, as the ratio of the second height h2 to the first height h1 decreases, the difference between the first and second heights h1 and h2 increases, and the size of the communication area CN increases, thereby decreasing resistance to the flow of the cooling fluid and increasing the velocity of the flow of the cooling fluid. However, the mechanical rigidity of the barrier wall 150 decreases. In embodiments of the present disclosure, the ratio of the second height h2 to the first height h1 may be determined to firmly maintain the shape of the barrier wall 150 and impart sufficient rigidity to the barrier wall 150 while considering driving power according to resistance to the flow of the cooling fluid.

In an embodiment, in the main portion 155, a section having the second height h2 may be at a middle position of a section having the first height h1 in the height direction of the barrier wall 150, and, thus, an upper stepped section and a lower stepped section may be formed between the section having the second height h2 and the section having the first height h1. In this case, the communication area CN may include a first communication area CN1 corresponding to the upper stepped section close to the first cover 100a, and a second communication area CN2 corresponding to the lower stepped section close to the second cover 100b. In this case, the cooling fluid may smoothly flow between the upstream area A1 and the downstream area A2 through the first and second communication areas CN1 and CN2 that are formed at opposite positions in the height direction of the barrier wall 150. For example, the first communication area CN1 may form a flow of the cooling fluid making contact with sides of the first end portions 11 of the battery cells 10, and the second communication area CN2 may form a flow of the cooling fluid making contact with sides of the second end portions 12 of the battery cells 10. That is, the first and second communication areas CN1 and CN2 may induce a flow of the cooling fluid along the first and second end portions 11 and 12 which relatively intensively generate heat.

In an embodiment of the present disclosure, the communication area CN may be provided as openings corresponding to the difference between the first and second heights h1 and h2 of the main portion 155 of the barrier wall 150. In another embodiment of the present disclosure, the communication area CN may be provided as hole-shaped openings formed in the main portion 155 of the barrier wall 150 such that the cooling fluid may make a U-turn while continuously flowing in the upstream area A1 and the downstream area A2.

In an embodiment of the present disclosure, the communication area CN may be formed in the main portion 155 of the barrier wall 150. The main portion 155 of the barrier wall 150 may guide the flow of the cooling fluid while extending across the accommodation space A, and, thus, the communication area CN for reversing the flow of the cooling fluid may be formed in the main portion 155. In another embodiment of the present disclosure, the barrier wall 150 may not include the first and second coupling portions 151 and 152 to be coupled to the first and second covers 100a and 100b. In this case, since the main portion 155 is not distinguished from the first and second coupling portions 151 and 152, it may be considered that the communication area CN is formed in the barrier wall 150.

Figure 7A:
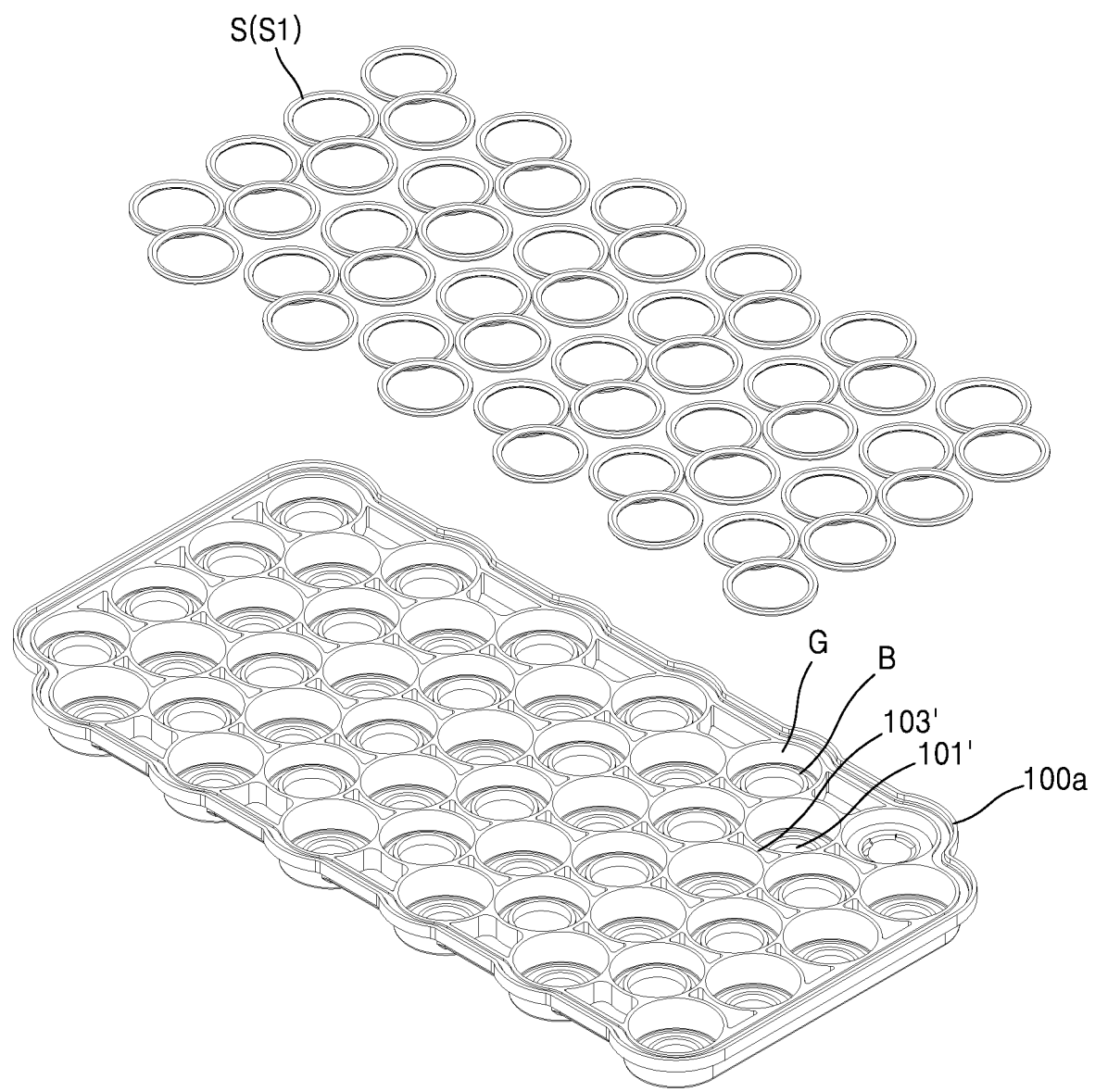
FIGS. 7A and 7B are an exploded perspective view and a plan view, respectively, illustrating a first cover shown in FIG. 1.
Figure 7B:
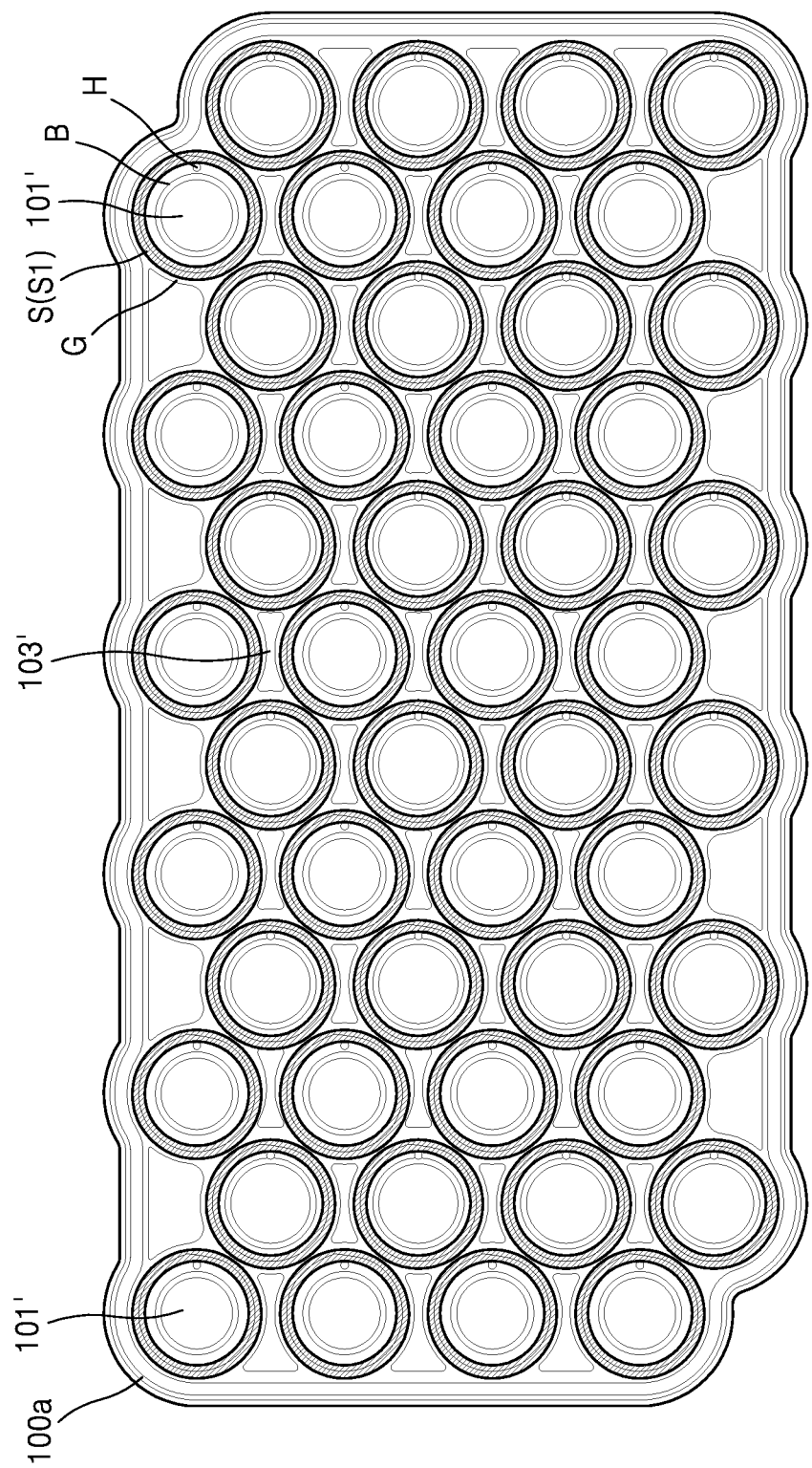

FIGS. 7A and 7B are an exploded perspective view and a plan view, respectively, illustrating the first cover 100a shown in FIG. 1.

Referring to FIGS. 1, 7A, and 7B, the case 100 may hermetically contain the cooling fluid for cooling the battery cells 10, and the accommodation space A filled with the cooling fluid may be sealed to prevent leakage of the cooling fluid from the inside of the accommodation space A.

The first and second terminal holes 101' and 102' may be formed in the first and second covers 100a and 100b of the case 100 to expose the first and second end portions 11 and 12 of the battery cells 10 therethrough, and the battery cells 10 may be electrically connected to each other through the first and second end portions 11 and 12 exposed through the first and second terminal holes 101' and 102'.

In an embodiment, the first and second terminal holes 101' and 102' may expose only center portions of the first and second end portions 11 and 12 of the battery cells 10 such that the first and second end portions 11 and 12 of the battery cells 10 may not completely pass through the first and second terminal holes 101' and 102', and edge portions of the first and second end portions 11 and 12 may be covered with portions of the first and second covers 100a and 100b formed around the first and second terminal holes 101' and 102'.

Referring to FIGS. 1 and 7B, the guide ribs G may be formed on the first and second covers 100a and 100b. The guide ribs G surrounding the peripheries of the first and second end portions 11 and 12 of the battery cells 10 may be formed outside barrier ribs B surrounding the first and second terminal holes 101' and 102', and the barrier ribs B and the guide ribs G that are located at inner sides and outer sides relative to the first and second terminal holes 101' and 102' may extend in parallel to each other in the shape of concentric circles from the first and second covers 100a and 100b toward the first and second end portions 11 and 12 of the battery cells 10. While regulating the assembling positions of the battery cells 10, the guide ribs G may fix sealing members S (refer to FIG. 7B) in position from the outsides of the sealing members S and may thus prevent or substantially prevent movement or wobbling of the sealing members S. Further aspects of the barrier ribs B and the sealing members S will be described later.

The guide ribs G may have a ring shape to surround the peripheries of the first and second end portions 11 and 12 and may be arranged in rows in such a manner that guide ribs G of a row may be placed in valleys between guide ribs of an adjacent row. The guide ribs G are formed at positions corresponding to the battery cells 10 that are arranged in such a manner that battery cells 10 of a row are placed in valleys between battery cells 10 of an adjacent row. Therefore, the guide ribs G may also be arranged in a pattern corresponding to the arrangement of the battery cells 10.

For example, the gap portions 103' may be formed between the guide ribs G in such a manner that each of the gap portions 103' is formed between guide ribs G adjacent to each other and facing each other with a valley therebetween. For example, each of the gap portions 103' may be provided in a surplus space among four neighboring guide ribs G having adjacent peripheries.

The gap portions 103' may absorb tolerance of adjacent guide ribs G and may provide coupling positions for fixing the position of the barrier wall 150 (refer to FIG. 5) provided in the case 100. In an embodiment, the gap portions 103' may be thinner than the guide ribs G protruding from the first and second covers 100a and 100b to provide coupling positions to the barrier wall 150 (refer to FIG. 5) and prevent or substantially prevent variations in the distance between adjacent guide ribs G caused by contraction of the gap portions 103' when a high-temperature molten resin is cooled to room temperature during an injection molding process.

Referring to FIGS. 7A and 7B, the sealing members S may be arranged on the first cover 100a. For example, the sealing members S may be arranged around the first terminal holes 101' to block cooling fluid leakage paths formed through the first terminal holes 101'. Although not shown in FIGS. 7A and 7B, other sealing members S may be arranged around the second terminal holes 102' of the second cover 100b to block cooling fluid leakage paths formed through the second terminal holes 102'. In the following description, the sealing members S arranged around the first terminal holes 101' will be mainly described, but the sealing members S arranged around the second terminal holes 102' may have substantially the same technical aspects.

The sealing members S may have a ring shape to continuously surround the first terminal holes 101'. In an embodiment of the present disclosure, a plurality of sealing members S (for example, first sealing members S1) may be individually respectively provided around the first terminal holes 101' to surround the first terminal holes 101', and the sealing members S (for example, first sealing members S1) may be respectively placed inside the guide ribs G surrounding the first end portions 11 of the battery cells 10. In another embodiment of the present disclosure, a plurality of sealing members S (first sealing members S1) may be connected to each other as a single sheet, and, in this case, the sealing members S (first sealing members S1) may be concurrently (e.g., simultaneously) aligned with the first terminal holes 101' through a single position arranging action.

Figure 8:
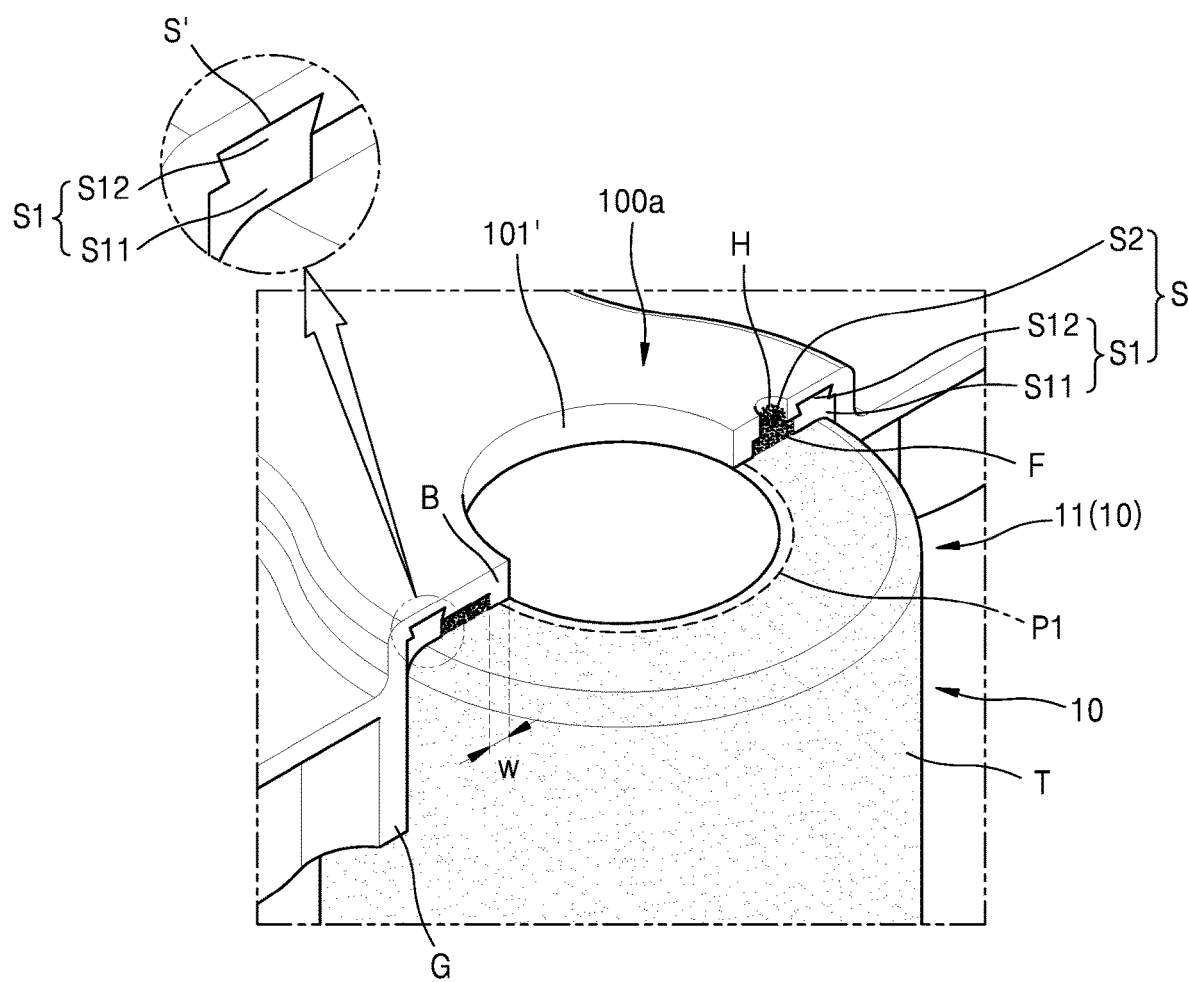
FIG. 8 is a cut-away view taken along the line VIII-VIII in FIG. 1.

FIG. 8 is a cut-away view taken along the line VIII-VIII in FIG. 1.

Referring to FIG. 8, in an embodiment, the sealing members S may include first and second sealing members S1 and S2 doubly surrounding the first terminal holes 101' from the outsides of the first terminal holes 101'. The first terminal holes 101' may be sealed by doubly surrounding the first terminal holes 101' with the first and second sealing members S1 and S2, and the first and second sealing members S1 and S2 may doubly block gaps between the first cover 100a and the first end portions 11 of the battery cells 10 from the outsides of the first terminal holes 101'.

The first and second sealing members S1 and S2 may have a ring shape to continuously surround the first terminal holes 101'. For example, the first sealing members S1 may have a ring shape and surround the first terminal holes 101' at relatively outer positions, and the second sealing members S2 may have a ring shape and surround the first terminal holes 101' at relatively inner positions.

In an embodiment, the first sealing members S1 may have a preformed shape and may be formed together with the first cover 100a by an insert molding method. For example, the first sealing members S1 may include an elastic material having high sealing characteristics, and the elastic material may be a rubber material, such as ethylene propylene diene terpolymer (EPDM).

In an embodiment, the first sealing members S1 may include protruding portions S11 protruding from the first cover 100a. The first sealing members S1 are for blocking gaps between the first cover 100a and the first end portions 11 of the battery cells 10, and the protruding portions S11 of the first sealing members S1 may protrude from the first cover 100a and make contact with the first end portions 11 of the battery cells 10. For example, the protruding portions S11 may surround the first terminal holes 101' and block cooling fluid leakage paths formed through the first terminal holes 101', and, to this end, the protruding portions S11 may protrude from the first cover 100a and may be elastically brought into contact with the first end portions 11 of the battery cells 10 by pressure.

As described above, portions of the first sealing members S1 may form the protruding portions S11 protruding from the first cover 100a and making contact with the first end portions 11 of the battery cells 10, and the other portions of the first sealing members S1 may form buried portions S12 inserted into coupling grooves S' formed in the first cover 100a for fixing the positions of the first sealing members S1. The protruding portions S11 and the buried portions S12 may adjoin each other to form sides and other sides of the first sealing members S1.

The buried portions S12 and the coupling grooves S' of the first cover 100a may have complementary shapes for matching each other and may be fitted to each other like dovetails to prevent separation. For example, the buried portions S12 may have a width gradually increasing in a recessed direction of the coupling grooves S', and the widths of the buried portions S12 increasing in the recessed direction of the coupling grooves S' may function as stop jaws preventing separation from the coupling grooves S'.

In an embodiment, the buried portions S12 may be formed by an insert molding method in a state in which the buried portions S12 are inserted in the coupling grooves S' of the first cover 100a. For example, after the first sealing members S1 including the buried portions S12 having a dovetail shape are fixed to the inside of a mold (not shown) in which a molten resin may be injected for forming the first cover 100a, the molten resin may be injected into the mold to form the first cover 100a having the coupling grooves S' matching the dovetail-shaped buried portions S12. Then, the buried portions S12 may be formed in a state in which the buried portions S12 are buried in the coupling grooves S' of the first cover 100a.

The first and second sealing members S1 and S2 may surround the first terminal holes 101' from the outsides of the first terminal holes 101' at different positions. That is, the first sealing members S1 may be around the outsides of the first terminal holes 101', and the second sealing members S2 may be placed between the first terminal holes 101' and the first sealing members S1 in a radius direction of the first terminal holes 101'.

In the present disclosure, the radius direction of the first terminal holes 101' does not necessarily mean that the first terminal holes 101' have a circular shape. That is, the first terminal holes 101' may have any shape, such a circular shape or an elliptical shape, and the radius direction of the first terminal holes 101' may refer to a direction from the center of a first terminal hole 101' toward the outside of the first terminal hole 101'.

The second sealing members S2 may be filled between the first terminal holes 101' and the first sealing members S1 and may include a material having fluidity variable by heating. For example, the second sealing members S2 may be liquid or gel similar to liquid and may have sufficient fluidity for permeating into filling spaces F between the first terminal holes 101' and the first sealing members S1. As the second sealing members S2 cool to room temperature, the second sealing members S2 may solidify. The second sealing members S2 may include a material having fluidity variable by heat, pressure, or light having a particular wavelength band. That is, the fluidity of the material of the second sealing members S2 may be varied by various fluidity adjusting factors, such as heating, pressurizing, or irradiation with light.

The barrier ribs B may be formed along the outsides of the first terminal holes 101' to prevent permeation of the second sealing members S2 having fluidity. For example, the barrier ribs B may protrude from the first cover 100a toward the first end portions 11 of the battery cells 10 to define the filling spaces F for the second sealing members S2 while preventing or substantially preventing the second sealing members S2 having fluidity from permeating into the first terminal holes 101' through gaps between the first cover 100a and the first end portions 11 of the battery cells 10. The barrier ribs B may be formed around the outsides of the first terminal holes 101'. For example, the barrier ribs B may surround the first terminal holes 101' and define the first terminal holes 101'.

While defining the filling spaces F for the second sealing members S2 from the outsides of the first terminal holes 101', the barrier ribs B may block cooling fluid leakage paths formed through the first terminal holes 101' together with the first and second sealing members S1 and S2. That is, since the barrier ribs B provide additional sealing portions surrounding the first terminal holes 101' in addition to the first and second sealing members S1 and S2, a triple sealing structure may be provided to the peripheries of the first terminal holes 101'.

The filling spaces F for the second sealing members S2 may be defined between the barrier ribs B and the first sealing members S1 in the radius direction of the first terminal holes 101' and between the first cover 100a and the first end portions 11 of the battery cells 10 in a direction penetrating the first terminal holes 101'. For example, the filling spaces F for the second sealing members S2 may be formed in a doughnut shape around the peripheries of the first terminal holes 101'.

In an embodiment, injection holes H connected to the filling spaces F may be formed in the first cover 100a. For example, the injection holes H may be formed at positions between the barrier ribs B and the first sealing members S1 that form the filling spaces F. The second sealing members S2 may be injected into the filling spaces F through the injection holes H to fill the filling spaces F and then the injection holes H. For example, the second sealing members S2 pressurized to a given pressure may be injected into the filling spaces F through the injection holes H to substantially fill the entire volume of the filling spaces F.

The first and second sealing members S1 and S2 may provide a double sealing structure at positions adjacent to each other in the radius direction of the first terminal holes 101'. However, the scope of the present disclosure is not limited thereto. The sealing structure of the present disclosure may include multiple sealing portions having non-continuous boundaries in the radius direction of the first terminal holes 101' and arranged adjacent to each other. Therefore, leakage of the cooling fluid through the first terminal holes 101' may be reliably prevented by the multiple sealing structure which provides at least double sealing.

In the embodiment shown in FIG. 8, unlike the first sealing members S1, the second sealing members S2 may be liquid or of any form similar to liquid and injected through the injection holes H formed in the first cover 100a. However, the scope of the present disclosure is not limited thereto. For example, instead of filling the second sealing members S2 through the injection holes H, the second sealing members S2 may be formed in a preformed shape and injected molded together with the first cover 100a, or may be formed separately from the first cover 100a and may then be inserted into the first cover 100a.

The first and second sealing members S1 and S2 may be arranged around the outsides of the first terminal holes 101', and although not shown in the drawings, other first and second sealing members S1 and S2 may also be arranged around the outsides of the second terminal holes 102'. The first and second sealing members S1 and S2 around the second terminal holes 102' may doubly block gaps between the second cover 100b and the second end portions 12 of the battery cells 10 from the outsides of the second terminal holes 102'. That is, the first sealing members S1 may have a ring shape along the outsides of the second terminal holes 102', and the second sealing members S2 may be filled in filling spaces F defined by the barrier ribs B surrounding the second terminal holes 102' and the first sealing members S1 provided outside the barrier ribs B. The technical characteristics of the first and second sealing members S1 and S2 may be substantially the same as those described above, and thus descriptions thereof will not be repeated here.

Figure 9A:
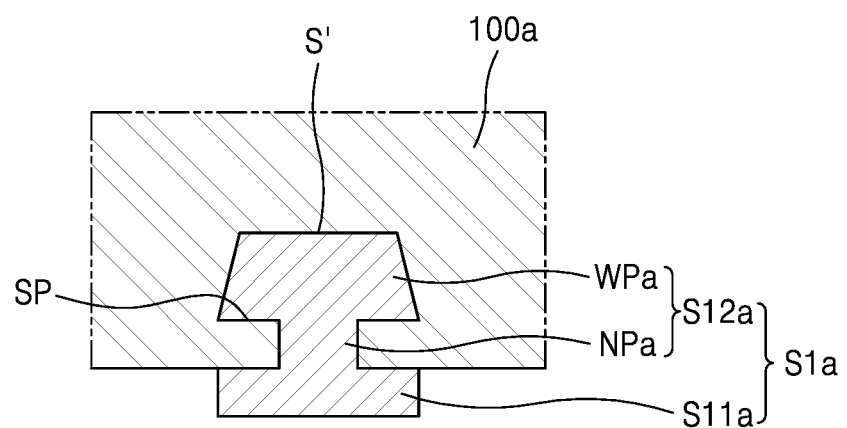
FIGS. 9A and 9B are cross-sectional views illustrating modifications of a first sealing member shown in FIG. 8.
Figure 9B:
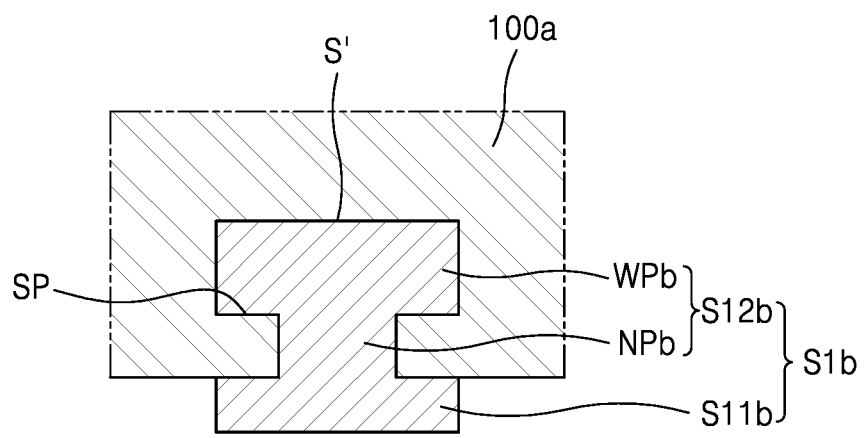

FIGS. 9A and 9B are cross-sectional views illustrating modifications of the first sealing member S1 shown in FIG. 8.

Referring to FIGS. 9A and 9B, first sealing members S1a and S1b may include: portions S12a and S12b buried in the first cover 100a; and protruding portions S11a and S11b extending from the buried portions S12a and S12b and protruding from the first cover 100a. The buried portions S12a and S12b may have a shape complementary to the shape of the coupling grooves S' of the first cover 100a, and at least portions of the buried portions S12a and S12b may be wider than stop jaws SP of the coupling grooves S' such that the buried portions S12a and S12b may not be separated owing to the stop jaws SP.

For example, the buried portions S12a and S12b may include: narrow-width portions NPa and NPb forming bottle-neck portions of the first sealing members S1a and S1b corresponding to the stop jaws SP of the coupling grooves S'; and wide-width portions WPa and WPb wider than the narrow-width portions NPa and NPb. In this case, as shown in FIGS. 9A and 9B, the wide-width portions WPa and WPb may have any of various shapes, such as a trapezoidal cross-sectional shape or a rectangular cross-sectional shape, as long as the wide-width portions WPa and WPb are wider than a width between the stop jaws SP for preventing separation from the stop jaws SP. The protruding portions S11a and S11b may protrude from the first cover 100a and make contact with the first end portions 11 of the battery cells 10. The protruding portions S11a and S11b may be wider than the narrow-width portions NPa and NPb of the buried portions S12a and S12b for forming a large contact area with the first end portions 11 of the battery cells 10.

In an embodiment, the first sealing members S1a and S1b shown in FIGS. 9A and 9B may be formed by an injection molding method like the first sealing member S1 shown in FIG. 8, or may be formed separately from the first cover 100a and may then be inserted into the coupling grooves S' of the first cover 100a.

The case 100 may accommodate the battery cells 10 and the cooling fluid for cooling the battery cells 10. Here, the cooling fluid may refer to a liquid cooling medium having higher thermal capacity and heat-dissipating performance than a gas cooling medium, such as air. The cooling fluid may flow in the accommodation space A (refer to FIG. 1) while directly making contact with the battery cells 10, thereby dissipating heat from the surfaces of the battery cells 10. For example, the accommodation space A (refer to FIG. 1) of the case 100 may accommodate the cooling fluid directly making contact with the battery cells 10, and convective heat transfer may occur by the flow of the cooling fluid in the accommodation space A (refer to FIG. 1) such that heat may be directly transferred from the battery cells 10.

In an embodiment of the present disclosure, the battery cells 10 may be large battery cells having high output power and high capacity to provide high electrical output power, and, thus, a relatively large amount of heat may be generated during charging and discharging operations of the battery cells 10. Thus, according to embodiments of the present disclosure, a flow of the cooling fluid directly making contact with the battery cells 10 is induced to dissipate heat from the battery cells 10, and since the cooling fluid having higher heat capacity than a gas cooling medium, such as air, is used, heat generated during operations of the battery cells 10 may be smoothly dissipated.

In an embodiment of the present disclosure, the battery cells 10 may have a cylindrical shape with a diameter of about 21 mm or greater and a length of about 700 mm or greater. For example, heat dissipation through direct contact with the cooling fluid may be effective in smoothly dissipating heat from cylindrical battery cells having a diameter of about 30 mm or greater and a length of about 1000 mm or greater, and, thus, a high-power, high-capacity battery pack may be provided by increasing the size of battery cells 10 to increase the output power of the battery cells 10. However, the scope of the present disclosure is not limited to relatively large battery cells. The inventive concept of the present disclosure may be applied by considering electrical output power characteristics in applications. For example, the inventive concept may be applied to applications requiring momentarily high output power, applications involving generation of a large amount of heat depending on situations such as battery cells having relatively high internal resistance, or applications involving battery cells in which a large amount of heat is characteristically generated.

The cooling fluid may include an electrically insulative fluid or an electrically conductive fluid, and, as shown in FIG. 8, insulative layers T may be provided on the outsides of the battery cells 10 that directly make contact with the cooling fluid. For example, the surfaces of the battery cells 10 may have the same polarity as the first end portions 11 or the second end portions 12 of the battery cells 10, and the insulative layers T may be formed on the surfaces of the battery cells 10 to prevent electrical interference between the battery cells 10 occurring due to the flow of the cooling fluid that transfers heat while directly making contact with the battery cells 10.

As shown in FIG. 8, the insulative layers T of the battery cells 10 may be formed in such a manner that the center portions of the first end portions 11 at which electrical connection of the battery cells 10 occurs may be exposed to the outside. For example, the insulative layers T may be formed on the entirety of the battery cells 10 except the center portions of the first end portions 11 of the battery cells 10 where electrical connection is made and the center portions of the second end portions 12 of the battery cells 10 where electrical connection is made. That is, the insulative layers T may entirely surround lateral surfaces of the battery cells 10 and may end at the first and second end portions 11 and 12 of the battery cells 10. That is, end positions P1 of the insulative layers T may be on the first and second end portions 11 and 12, and the center portions of the first and second end portions 11 and 12 beyond the end positions P1 of the insulative layers T may not be covered with the insulative layers T but may be exposed for electrical connection.

In the following description, the end positions P1 formed on the first end portions 11 of the first and second end portions 11 and 12 of the battery cells 10 will be mainly described. However, the following description may also be applied to the end positions P1 of the insulative layers T formed on the second end portions 12 of the battery cells 10.

Referring to FIG. 8, the end positions P1 of the insulative layers T may be between the first terminal holes 101' and the second sealing members S2 in the radius direction of the first terminal holes 101'. That is, maximally, the insulative layers T may be formed up to the first terminal holes 101', and, minimally, the insulative layers T may be formed up to the second sealing members S2.

If the insulative layers T extend to the insides of the first terminal holes 101' and cover the center portions of the first end portions 11 of the battery cells 10, the insulative layers T may interfere in electrical connection of the battery cells 10, and if the insulative layers T are not formed up to positions where the permeation of the cooling fluid is doubly blocked by the first and second sealing members S1 and S2, a leak of the cooling fluid may directly make contact with the battery cells 10 to result in electrical inference.

The end positions P1 of the insulative layers T may be between the first terminal holes 101' and the second sealing members S2. In an embodiment of the present disclosure, the end positions P1 of the insulative layers T may be located within a thickness (w) of the barrier ribs B corresponding to regions between the first terminal holes 101' and the second sealing members S2. For example, since the barrier ribs B have inner sides surrounding the first terminal holes 101' and outer sides making contact with the second sealing members S2, the end positions P1 of the insulative layers T may be within the thickness (w) of the barrier ribs B between the inner and outer sides of the barrier ribs B.

Figure 10:
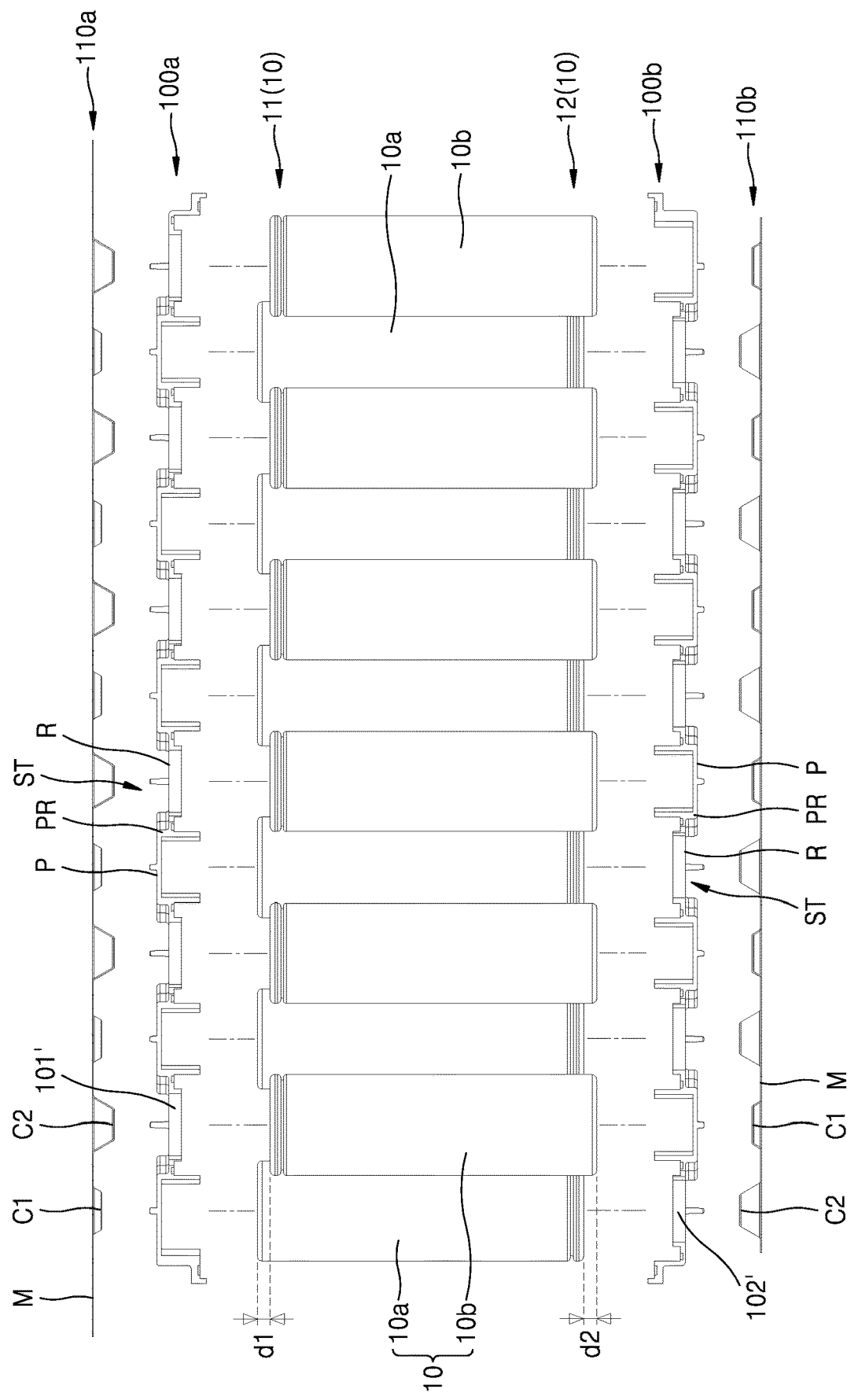
FIG. 10 is a view illustrating an arrangement of the battery cells shown in FIG. 1.

FIG. 10 is a view illustrating an arrangement of the battery cells 10 shown in FIG. 1.

Referring to FIG. 10, the battery cells 10 may include first and second battery cells 10a and 10b that are arranged at offset levels in the length direction of the first and second battery cells 10a and 10b. In this case, the first and second battery cells 10a and 10b may have first end portions 11 adjacent to each other and second end portions 12 adjacent to each other and located opposite the first end portions 11, and the first and second end portions 11 and 12 may have height differences d1 and d2. Here, the first end portions 11 may refer to end portions of the battery cells 10 facing the first cover 100*a*, and the second end portions 12 may refer to the other end portions of the battery cells 10 facing the second cover 100*b*.

In an embodiment, since the first and second battery cells 10*a* and 10*b* having the same length are arranged at offset levels in the length direction of the first and second battery cells 10*a* and 10*b*, the height difference d1 between the first end portions 11 adjacent to each other may be equal to the height difference d2 between the second end portions 12 adjacent to each other, and the first and second battery cells 10*a* and 10*b* may be stepped in opposite directions. Therefore, the first battery cells 10*a* having relatively protruding first end portions 11 may have relatively recessed second end portions 12, and the second battery cells 10*b* having relatively recessed first end portions 11 may have relatively protruding second end portions 12. That is, when the first end portions 11 of the first battery cells 10*a* protrude outward more than the first end portions 11 of the second battery cells 10*b*, the second end portions 12 of the first battery cells 10*a* may be recessed inward more than the second end portions 12 of the second battery cells 10*b* by the protruding amount of the first end portions 11 of the first battery cells 10*a*.

For example, the height difference d1 between the adjacent first end portions 11 of the first and second battery cells 10*a* and 10*b* and the height difference d2 between the adjacent second end portions 12 of the first and second battery cells 10*a* and 10*b* may be within a range of about 3 mm to about 12 mm, for example, within a range of about 4 mm to about 10 mm. As described later, the height difference d1 between the adjacent first end portions 11 and the height difference d2 between the adjacent second end portions 12 may be within a range of about 3 mm or greater, for example, within a range of about 4 mm or greater, to provide a sufficient emission or discharge path. In an embodiment, the height difference d1 between the adjacent first end portions 11 and the height difference d2 between the adjacent second end portions 12 may be about 12 mm or less, for example, about 10 mm or less, to prevent or substantially prevent a decrease in the energy density of the battery pack caused by excessive values of the height differences d1 and d2.

The first and second battery cells 10*a* and 10*b* may be substantially the same battery cells 10 and may be arranged to reverse the polarities of the first and second end portions 11 and 12. That is, the first end portions 11 of the first and second battery cells 10*a* and 10*b* may have electrically opposite polarities, and the second end portions 12 of the first and second battery cells 10*a* and 10*b* may have electrically opposite polarities. In this case, since the first and second battery cells 10*a* and 10*b* are arranged such that the first and second end portions 11 and 12 may have opposite polarities and may be at offset levels, the first end portions 11 of the first and second battery cells 10*a* and 10*b* may have electrically opposite polarities and may spatially form the height difference d1, and, similarly, the second end portions 12 of the first and second battery cells 10*a* and 10*b* that are adjacent to each other at a side opposite the first end portions 11 may have electrically opposite polarities and may spatially form the height difference d2.

Referring to FIGS. 1 and 10, the first cover 100*a* may be placed on the first end portions 11 of the first and second battery cells 10*a* and 10*b* to cover the first end portions 11, and the second cover 100*b* may be placed on the second end portions 12 of the first and second battery cells 10*a* and 10*b* to cover the second end portions 12. In this case, the first cover 100*a* may form height difference spaces ST on an outer side of the first cover 100*a* while extending along the height difference d1 between the first end portions 11 of the first and second battery cells 10*a* and 10*b*, and, similarly, the second cover 100*b* may form other height difference spaces ST on an outer side of the second cover 100*b* while extending along the height difference d2 between the second end portions 12 of the first and second battery cells 10*a* and 10*b*.

In the following description, the height difference spaces ST formed on the outer side of the first cover 100*a* will be mainly described, but the description of the height difference spaces ST may apply to the height difference spaces ST formed on the outer side of the second cover 100*b*.

Referring to FIGS. 1 and 10, the first cover 100*a* may include: protruding portions P and recessed portions R that cover the first end portions 11 of the first and second battery cells 10*a* and 10*b* at different levels; and stepped portions PR extending along the height difference d1 between the first end portions 11 of the first and second battery cells 10*a* and 10*b*. In addition, the height difference spaces ST corresponding to the height difference d1 between the first end portions 11 of the first and second battery cells 10*a* and 10*b* may be formed on outer sides of the recessed portions R.

In an embodiment of the present disclosure, the protruding portions P may form a relatively protruding high level to cover the first end portions 11 of the first battery cells 10*a* that relatively protrude in a projecting shape, and the recessed portions R may form a relatively recessed low level to cover the first end portions 11 of the second battery cells 10*b* that are relatively recessed in a sunken shape. In addition, the stepped portions PR may connect the protruding portions P and the recessed portions R to each other while extending along the height difference d1 between the first end portions 11 of the first and second battery cells 10*a* and 10*b*. In this case, the height difference spaces ST may be formed on the outer sides of the recessed portions R formed at a relatively low level.

In an embodiment of the present disclosure shown in FIG. 1, the first and second battery cells 10*a* and 10*b* may be arranged in rows, and rows of the first battery cells 10*a* and rows of the second battery cells 10*b* may be arranged side by side at neighboring positions. In an embodiment of the present disclosure, the first and second battery cells 10*a* and 10*b* may be cylindrical battery cells and may be arranged in such a manner that the first battery cells 10*a* may be placed in valleys between the second battery cells 10*b* neighboring each other, and the second battery cells 10*b* may be placed in valleys between the first battery cells 10*a* neighboring each other, thereby decreasing an unnecessary space and increasing the energy density of the battery pack.

The protruding portions P of the first cover 100*a* may be formed along the rows of the first battery cells 10*a* having the first end portions 11 that relatively protrude, and may include first terminal holes 101' for electrical connection of the first battery cells 10*a*. The recessed portions R of the first cover 100*a* may be formed along the rows of the second battery cells 10*b* having the first end portions 11 that are relatively recessed, and may include first terminal holes 101' for electrical connection of the second battery cells 10*b*. In an embodiment, since the height difference spaces ST are formed on the outer sides of the recessed portions R, the height difference spaces ST may be formed in the shape of channels N (refer to FIG. 1) extending across the first cover 100*a* along the rows of the second battery cells 10*b*.

The height difference spaces ST of the first cover 100*a* may provide emission or discharge paths for discharging emission gas from the battery cells 10. For example, the height difference spaces ST of the first cover 100a may be formed on the outer sides of the recessed portions R and may be connected through the first terminal holes 101' to the first end portions 11 of the second battery cells 10b that are relatively recessed in a sunken shape at inner sides of the recessed portions R, thereby providing emission or discharge paths for discharging emission gas from the first end portions 11 of the second battery cells 10b.

Figure 11:
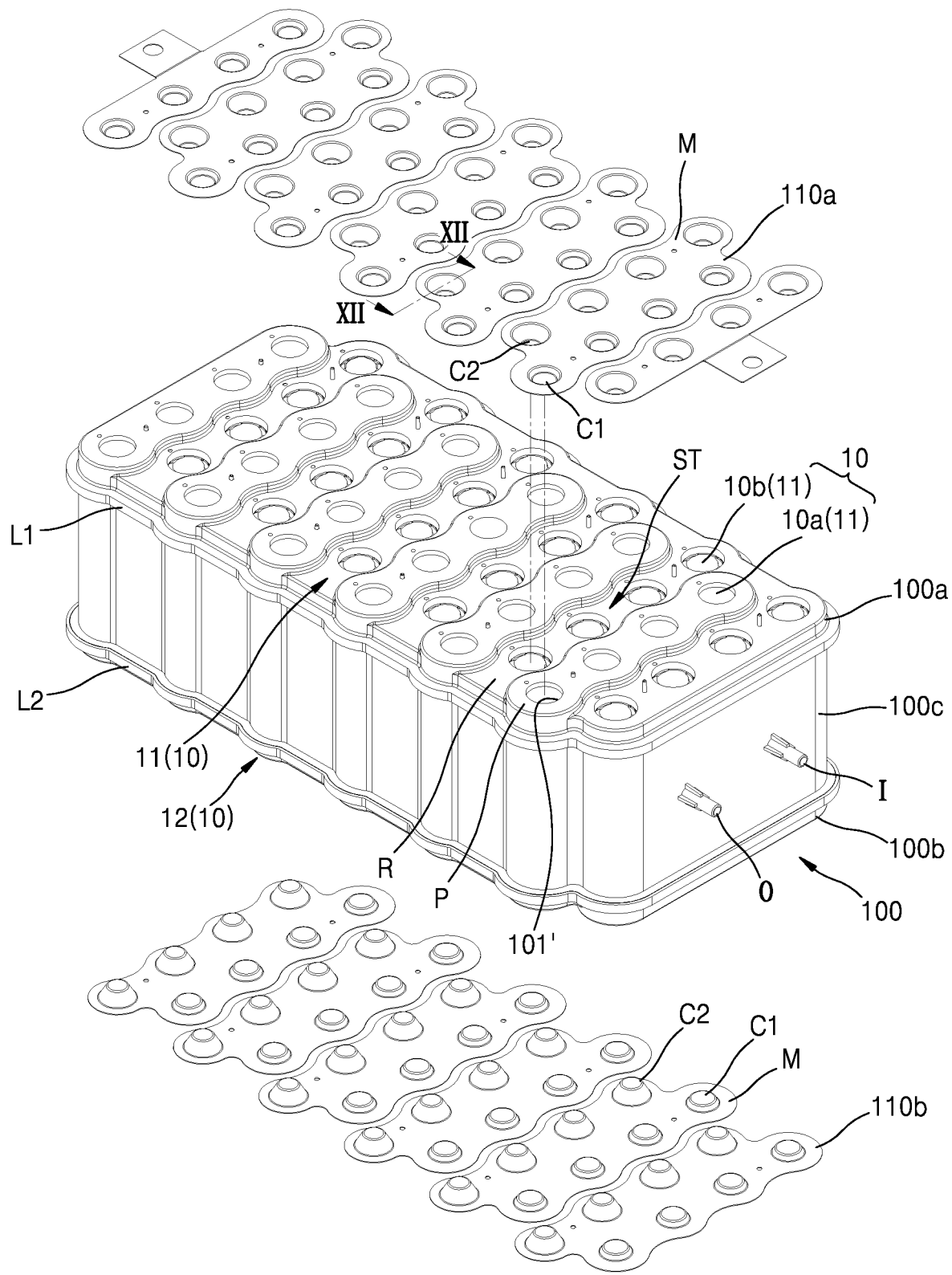
FIG. 11 is a perspective view illustrating height difference spaces of the battery pack shown in FIG. 1.
Figure 12:
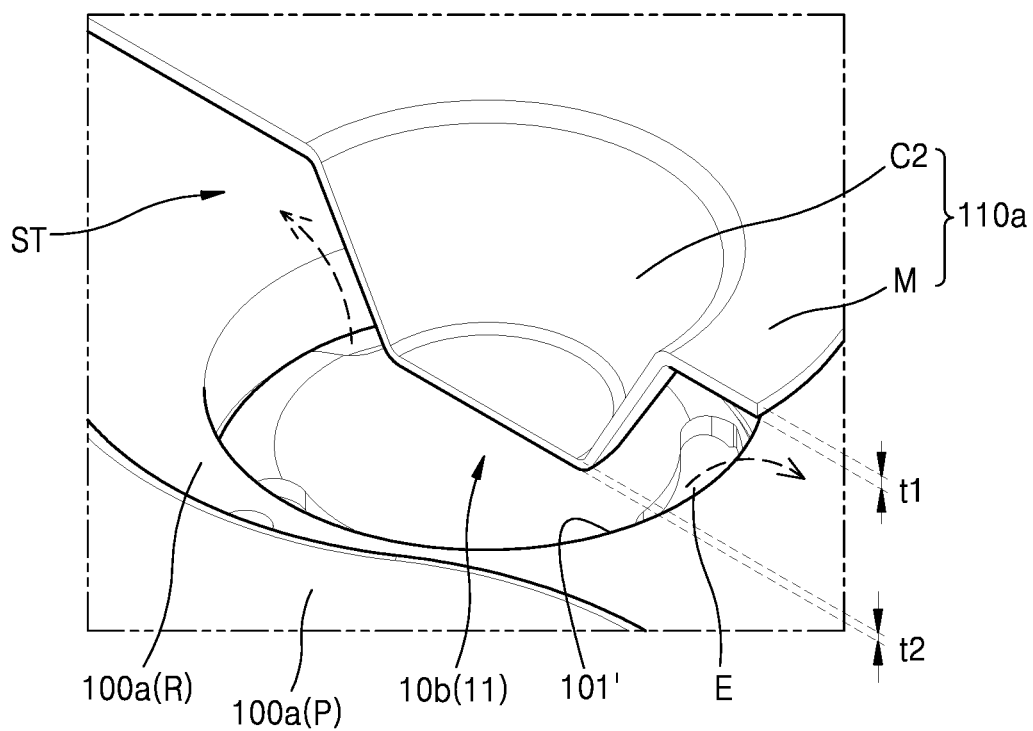
FIG. 12 is a cut-away view taken along the line XII-XII in FIG. 11 for illustrating gas discharged from a battery cell through a height difference space.

FIG. 11 is a perspective view illustrating the height difference spaces ST of the battery pack shown in FIG. 1; and FIG. 12 is a cut-away view taken along the line XII-XII in FIG. 11 for illustrating gas discharged from a battery cell 10 through a height difference space ST.

Referring to FIG. 11, the first tab plate 110a electrically connected to the first end portions 11 of the first and second battery cells 10a and 10b may be placed on the first cover 100a. Referring to FIG. 12, a first tab plate 110a may be connected to a first end portion 11 of a second battery cell 10b through a height difference space ST of the first cover 100a and a first terminal hole 101'. In this case, a gas discharge hole E (or emission hole) may be formed around a center portion of the first end portion 11 of the second battery cell 10b which is coupled to the first tab plate 110a. For example, a plurality of gas discharge holes E may be arranged to surround the center portion of the first end portion 11 of the second battery cell 10b such that emission gas accumulated in the second battery cell 10b may be rapidly discharged to the outside. In an embodiment of the present disclosure, the gas discharge holes E may be arranged in a circular shape to surround the center portion of the first end portion 11 and may be placed at substantially the same radial distance from the center of the center portion of the first end portion 11 such that all of the gas discharge holes E may be exposed through the first terminal hole 101' as described further later. In an embodiment of the present disclosure, the gas discharge holes E may include three gas discharge holes E arranged to surround the center portion of the first end portion 11. In an embodiment of the present disclosure, each of the gas discharge holes E may extend in a circular arc shape to surround the center portion of the first end portion 11. In another embodiment of the present disclosure, only a single gas discharge hole E may be provided, and the single gas discharge hole E may sufficiently extend in a circular arc shape to surround the center portion of the first end portion 11.

The gas discharge holes E and the center portion of the first end portion 11 may be exposed through the first terminal hole 101', and the first terminal hole 101' may have a sufficiently large size (for example, diameter) for exposing all of the gas discharge holes E and the center portion of the first end portion 11.

The gas discharge holes E may be connected through the first terminal hole 101' to the height difference space ST formed on the outer side of the first cover 100a. For example, emission gas discharged through the first terminal hole 101' may be guided to the outside through the height difference space ST between the first cover 100a (for example, a recessed portion R) and the first tab plate 110a, and since the height difference space ST provides an emission or discharge path connected to the first terminal hole 101', the height difference space ST may be considered as being located between the first cover 100a (for example, the recessed portion R) and the first tab plate 110a. In an embodiment, the first end portion 11 of the second battery cell 10b may be a positive electrode side in which the gas discharge holes E are formed.

Referring to FIG. 10, like the first cover 100a, the second cover 100b may extend along the height difference d2 between the second end portions 12 of the first and second battery cells 10a and 10b while covering the second end portions 12 of the first battery cells 10a and the second end portions 12 of the second battery cells 10b. Therefore, the height difference spaces ST corresponding to the height difference d2 between the second end portions 12 may be formed on the outer side of the second cover 100b. In this case, the height difference spaces ST may be formed on the second end portions 12 of the first battery cells 10a that are relatively recessed in a sunken shape.

The height difference spaces ST of the second cover 100b may provide emission or discharge paths for discharging emission gas from the battery cells 10. For example, the height difference spaces ST of the second cover 100b may be connected through the second terminal holes 102' to the second end portions 12 of the first battery cells 10a that are relatively recessed in a sunken shape at an inner side of the second cover 100b and may provide emission or discharge paths for discharging emission gas from the second end portions 12 of the first battery cells 10a. In an embodiment, other gas discharge holes E may be formed in the second end portions 12 of the first battery cells 10a to discharge emission gas accumulated in the first battery cells 10a, and the second end portions 12 of the first battery cells 10a may be positive electrode sides in which the gas discharge holes E are formed.

As described above, the height difference spaces ST of the first cover 100a may provide emission or discharge paths for discharging emission gas from the second battery cells 10b, and the height difference spaces ST of the second cover 100b may provide emission or discharge paths for discharging emission gas from the first battery cells 10a. Therefore, emission or discharge paths for the first and second battery cells 10a and 10b may be provided by the height difference spaces ST of the first cover 100a or the height difference spaces ST of the second cover 100b.

In an embodiment of the present disclosure, the first and second battery cells 10a and 10b are arranged adjacent to each other at offset levels to form the height difference d1 between the first end portions 11 of the first and second battery cells 10a and 10b and the height difference d2 between the second end portions 12 of the first and second battery cells 10a and 10b, and the height difference spaces ST are formed on the first end portions 11 or the second end portions 12 that are relatively recessed in a sunken shape to provide emission or discharge paths such that emission gas discharged through the first end portions 11 or the second end portions 12 that are relatively recessed in a sunken shape may be discharged to the outside through the height difference spaces ST. In this case, the gas discharge holes E may be formed in the first end portions 11 or the second end portions 12 that are relatively recessed in a sunken shape. In an embodiment of the present disclosure, the relatively recessed first end portions 11 of the second battery cells 10b and the relatively recessed second end portions 12 of the first battery cells 10a may form positive electrode sides in which the gas discharge holes E are formed, and the first end portions 11 of the first battery cells 10a and the second end portions 12 of the second battery cells 10b that relatively protrude in a projecting shape may form negative electrode sides.

Figure 13:
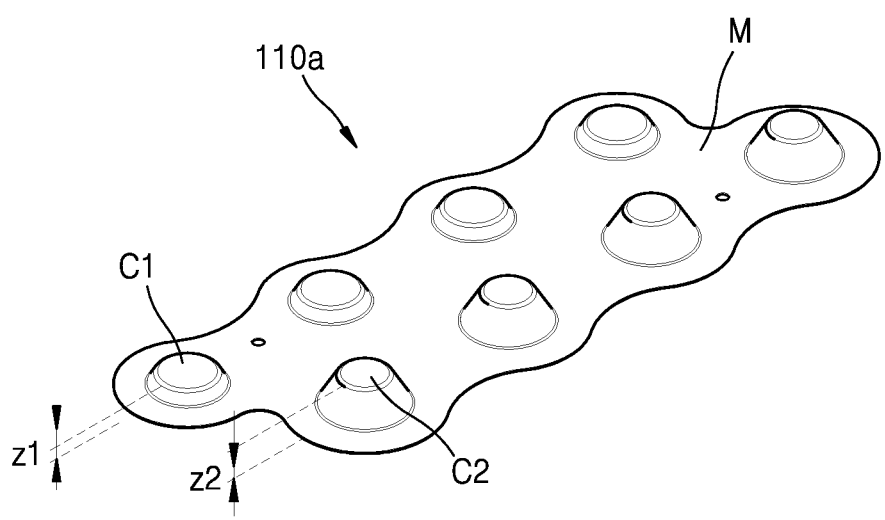
FIG. 13 is a perspective view illustrating a first tab plate shown in FIG. 11.

FIG. 13 is a perspective view illustrating a first tab plate 110a shown in FIG. 11.

Referring to FIGS. 11 and 13, the first tab plate 110a for electrically connecting the first end portions 11 of the first and second battery cells 10a and 10b may be placed on the outer side of the first cover 100a. The first tab plate 110a may include: a main portion M having a flat shape and configured to be placed on the first cover 100a; and first and second contact portions C1 and C2 protruding toward the first end portions 11 of the first and second battery cells 10a and 10b with different protruding depths.

The main portion M may be placed on the first cover 100a and may extend on the first cover 100a in a flat shape. The main portion M may be fixed to a position on the first cover 100a owing to the first and second contact portions C1 and C2 respectively coupled to the first end portions 11 of the first and second battery cells 10a and 10b.

The first and second contact portions C1 and C2 may make contact with the first end portions 11 of the first and second battery cells 10a and 10b that are exposed through the first terminal holes 101', and may have sufficient depths for reaching the first end portions 11 of the first and second battery cells 10a and 10b.

The first contact portions C1 may extend from the main portion M placed on the first cover 100a and may be coupled to the relatively protruding first end portions 11 of the first battery cells 10a through the first terminal holes 101' formed in the first cover 100a (for example, formed in the protruding portions P). The second contact portions C2 may extend from the main portion M placed on the first cover 100a and may be coupled to the relatively recessed first end portions 11 of the second battery cells 10b through the height difference spaces ST formed on the outer side of the first cover 100a (for example, formed on the outer sides of the recessed portions R) and the first terminal holes 101'. As described above, the first and second contact portions C1 and C2 may protrude from the main portion M to different depths and may be coupled to the relatively protruding first end portions 11 of the first battery cells 10a and the relatively recessed first end portions 11 of the second battery cells 10b, and, as shown in FIG. 13, a protruding depth z2 of the second contact portions C2 may be greater than a protruding depth z1 of the first contact portions C1.

The first and second contact portions C1 and C2 are not placed in the same plane as the main portion M but protrude from the main portion M to different depths such that the first and second contact portions C1 and C2 may make contact with the first end portions 11 of the first and second battery cells 10a and 10b that are stepped. The first and second contact portions C1 and C2 protruding from the main portion M placed on the first cover 100a have sufficient depths to pass through the first terminal holes 101' for making contact with the first end portions 11 of the first and second battery cells 10a and 10b.

In an embodiment, each of the first and second contact portions C1 and C2 may be shaped like a truncated cone having a cross-sectional area decreasing along (e.g., in proportion to) the protruding depth such that the first and second contact portions C1 and C2 may have radii gradually decreasing along (e.g., in proportion to) the protruding depths and may thus be coupled to the first end portions 11 of the first and second battery cells 10a and 10b when having minimal radii. Since the first and second contact portions C1 and C2 have cross-sectional radii decreasing along (e.g., in proportion to) the protruding depths from the main portion M and are coupled to the center portions of the first end portions 11 of the first and second battery cells 10a and 10b when the first and second contact portions C1 and C2 have minimal radii, the formation of emission or discharge paths may be provided by the gas discharge holes E (refer to FIG. 12) formed around the center portions of the first end portions 11.

In an embodiment, the first and second contact portions C1 and C2 may be thinner than the main portion M. The first and second contact portions C1 and C2 may be welded to the first end portions 11 of the first and second battery cells 10a and 10b, and the first and second contact portions C1 and C2 may have a relatively thin thickness for being sufficiently melted to improve welding strength. In an embodiment, the first and second contact portions C1 and C2 may be formed through a forging process or a press forming process in which portions of a raw-material metal sheet are extended downward, and may thus have a relatively thin thickness because the raw-material metal sheet is extended. For example, as shown in FIG. 12, minimal radius portions of the second contact portions C2 to be welded to the first end portions 11 of the second battery cells 10b may have a second thickness t2 less than a first thickness t1 of the main portion M. The first thickness t1 of the main portion M may be relatively large to decrease resistance to charging and discharging currents. For example, the first thickness t1 may be 1 mm or greater, and the second thickness t2 may be 0.4 mm or greater. In an embodiment, the second thickness t2 may have a minimum thickness of 0.4 mm to make bonding to the first end portions 11 of the second battery cells 10b through welding while maintaining shape, and the first thickness t1 may have a minimum thickness of 1 mm to produce the second thickness of 0.4 mm while extending through a forging process or a press forming process. In an embodiment of the present disclosure, the first thickness t1 may be 1 mm and the second thickness t2 may be 0.4 mm.

Referring to FIG. 13, a plurality of first contact portions C1 and a plurality of second contact portions C2 may be arranged on the main portion M in rows. In an embodiment of the present disclosure shown in FIG. 11, the first tab plate 110a may connect a row of first battery cells 10a and an adjacent row of second battery cells 10b to each other in such a manner that the first end portions 11 of the first battery cells 10a having the same polarity may be connected in parallel to each other and the first end portions 11 of the second battery cells 10b having the same polarity may be connected in parallel to each other while the first end portions 11 of the first and second battery cells 10a and 10b having opposite polarities are connected in series to each other. To connect the battery cells 10a and 10b in series-parallel using the first tab plate 110a as described above, the first tab plate 110a may include a plurality of first contact portions C1 and a plurality of second contact portions C2 to be connected to the first and second battery cells 10a and 10b, and the first and second contact portions C1 and C2 may be arranged in rows according to the first and second battery cells 10a and 10b arranged in rows.

Referring to FIG. 11, a second tab plate 110b for electrically connecting the second end portions 12 of the first and second battery cells 10a and 10b may be placed on the second cover 100b. Like the first tab plate 110a, the second tab plate 110b may include: a main portion M configured to be placed on the second cover 100b; and first and second contact portions C1 and C2 protruding from the main portion M to different depths.

The second tab plate 110b may connect the second end portions 12 of the first battery cells 10a having the same polarity to each other in parallel, the second end portions 12 of the second battery cells 10b having the same polarity to each other in parallel, and the second end portions 12 of the first and second battery cells 10a and 10b having different polarities to each other in series. To this end, a plurality of first contact portions C1 and a plurality of second contact portions C2 for being respectively connected to the first and second battery cells 10a and 10b may be formed on the second tab plate 110b.

According to an aspect of embodiments of the present disclosure, the arrangement of the first and second leads 120a and 120b electrically connected to the battery cells 10 of the battery pack are improved, thereby facilitating a welding process for connecting the first and second leads 120a and 120b and simplifying the circuit structure of the battery pack.

According to an aspect of embodiments of the present disclosure, heat may be more efficiently dissipated from the switch device 185 of the battery pack configured to allow and block the flow of charging and discharging currents in a high current path by using a flow of the cooling fluid contained in the accommodation space A together with the battery cells 10.

It is to be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as set forth by the following claims.

What is claimed is:

1. A battery pack comprising:
   a plurality of battery cells;
   a case having an accommodation space in which the plurality of battery cells and a cooling fluid to directly contact and cool the plurality of battery cells are configured to be accommodated;
   a barrier wall extending across the accommodation space along a length direction of the case extending from a first end side of the case to a second end side of the case opposite the first end side and dividing the accommodation space into an upstream area connected to an inlet of the cooling fluid and a downstream area connected to an outlet of the cooling fluid, the downstream area being spaced from the upstream area in a width direction of the case crossing the length direction; and
   a switch device on a first side of the case facing away from the barrier wall along the width direction, the first side of the case being closer to the upstream area than to the downstream area.

2. The battery pack of claim 1, wherein the barrier wall comprises a communication area connecting the upstream area and the downstream area to each other.

3. The battery pack of claim 2, wherein the inlet and the outlet are at the first end side of the case, and the communication area is at the second end side of the case.

4. The battery pack of claim 1, wherein the switch device is on a side of a long-side portion of the case, the long-side portion of the case extending in an extension direction of the barrier wall.

5. The battery pack of claim 1, wherein the case comprises:
   first and second covers configured to respectively cover first and second end portions of the plurality of battery cells, the first and second end portions of the plurality of battery cells being opposite each other in a length direction of the plurality of battery cells; and
   a middle case between the first and second covers.

6. The battery pack of claim 5, wherein the inlet, the outlet, and a coupling position of the barrier wall are at a short-side portion of the middle case, and the switch device is on a side of a long-side portion of the middle case.

7. The battery pack of claim 1, further comprising a circuit board on the first side of the case facing away from the barrier wall along the width direction.

8. A battery pack comprising:
   a plurality of battery cells;
   a case having an accommodation space in which the plurality of battery cells and a cooling fluid to directly contact and cool the plurality of battery cells are configured to be accommodated;
   a barrier wall extending across the accommodation space along a length direction of the case extending from a first end side of the case to a second end side of the case opposite the first end side and dividing the accommodation space into an upstream area connected to an inlet of the cooling fluid and a downstream area connected to an outlet of the cooling fluid, the downstream area being spaced from the upstream area in a width direction of the case crossing the length direction;
   a switch device on a first side of the case facing away from the barrier wall along the width direction; and
   a circuit board on a second side of the case facing a height direction that crosses each of the length direction and the width direction.

9. The battery pack of claim 3, wherein the switch device is adjacent the second end side of the case.

\* \* \* \* \*